United States Patent
Zolotykh et al.

(10) Patent No.: US 10,624,175 B2
(45) Date of Patent: Apr. 14, 2020

(54) LAMP WITH POWER SUPPLY CONTAINING GYROSCOPIC SENSOR USED FOR LIGHT MANAGEMENT OPERATIONS

(71) Applicant: Ledvance LLC, Wilmington, MA (US)

(72) Inventors: Valeriy Zolotykh, Abington, MA (US); Ravidasa Hegde, Andover, MA (US)

(73) Assignee: LEDVANCE LLC, Wilmington, MA (US)

( * ) Notice: Subject to any disclaimer, the term of this patent is extended or adjusted under 35 U.S.C. 154(b) by 92 days.

(21) Appl. No.: 15/705,448

(22) Filed: Sep. 15, 2017

(65) Prior Publication Data

US 2019/0090327 A1    Mar. 21, 2019

(51) Int. Cl.
*H05B 37/02* (2006.01)
*H05B 33/08* (2020.01)

(52) U.S. Cl.
CPC ..... *H05B 37/0227* (2013.01); *H05B 33/0842* (2013.01); *H05B 37/0272* (2013.01)

(58) Field of Classification Search
CPC ............ H05B 37/0218; H05B 37/0227; H05B 37/0236; H05B 37/0272; H05B 37/0281
USPC ........................................ 315/307, 312, 360
See application file for complete search history.

(56) References Cited

U.S. PATENT DOCUMENTS

| | | | | |
|---|---|---|---|---|
| 2012/0062558 A1* | 3/2012 | Lee | ......................... | G06F 3/017 345/419 |
| 2013/0342399 A1* | 12/2013 | Fukuda | ..................... | G01S 1/02 342/386 |
| 2014/0253924 A1* | 9/2014 | Sano | ..................... | G01J 3/2823 356/456 |
| 2014/0285999 A1* | 9/2014 | Luna | ...................... | F21V 13/02 362/95 |

* cited by examiner

*Primary Examiner* — Tung X Le
(74) *Attorney, Agent, or Firm* — Tutunjian & Bitetto

(57) ABSTRACT

A lighting method that includes providing a lamp having a light source, a controller and at least one gyroscopic sensor; and measuring at least one type of movement of the lamp with at least one gyroscopic sensor. The method may further include converting with the controller the at least one type of movement of the lamp measured by the at least one gyroscopic sensor to a characteristic of light; and projecting light from the light source having the characteristic of light converted by the controller correlated to the movement of the lamp measured by the gyroscopic sensor.

16 Claims, 12 Drawing Sheets

| ROTATION MEASURED BY GYROSCOPE | LIGHTING CHARACTERISTIC ADJUSTMENT IN RESPONSE TO MOTION MEASURED BY GYROSCOPE |
|---|---|
| PITCH + (ROTATE FORWARD) | TURN LAMP ON |
| PITCH - (ROTATE BACK) | TURN LAMP OFF |
| ROLL LEFT (CLOCKWISE) | CYCLE LIGHT COLOR |
| ROLL TO NEUTRAL FROM LEFT | STOP LIGHT COLOR CYCLE TO SET SELECTED LIGHT COLOR |
| ROLL RIGHT (COUNTERCLOCKWISE) | CYCLE LIGHT COLOR TEMPERATURE |
| ROLL TO NEUTRAL FROM RIGHT | STOP LIGHT COLOR TEMPERATURE CYCLE TO SET SELECTED LIGHT COLOR TEMPERATURE |
| YAW LEFT (CLOCKWISE) | CYCLE LIGHT INTENSITY- INCREASE |
| YAW TO NEUTRAL FROM LEFT | STOP CYCLE OF INCREASING LIGHT INTENSITY TO SET LIGHT INTENSITY |
| YAW RIGHT (COUNTERCLOCKWISE) | CYCLE LIGHT INTENSITY- DECREASE (DIMMING) |
| YAW TO NEUTRAL FROM RIGHT | STOP CYCLE OF DECREASING LIGHT INTENSITY TO SET LIGHT INTENSITY |

LAMP WITH POWER SUPPLY CONTAINING GYROSCOPIC SENSOR USED FOR LIGHT MANAGEMENT OPERATIONS

TECHNICAL FIELD

The present disclosure generally relates to interfaces with lighting, and more particularly to methods of controlling color, color temperature or dimming levels of lamps through lighting interfaces.

BACKGROUND

Home and professional environments can contain many controllable lighting devices for creation of ambient, atmosphere, accent or task lighting. These controllable lighting devices are often connected and controlled via a network, which can be wired or wireless. These lighting devices can be controlled individually or in groups via a user interface of a lighting control.

SUMMARY

In one aspect, a method for controlling lighting is provided using a motion sensor that is configured within a lamp so that the motion of the lamp can be used as a way to select lighting characteristics, such as color, color temperature, and/or lighting intensity, to be displayed by lamp. In one embodiment, the method includes providing a lamp having a light source, a microcontroller and a gyroscopic motion sensors. The gyroscopic motion sensor measures the types of movements applied to the lamp. The microcontroller converts the types of movements applied to the lamp that are measured by the gyroscopic motion sensor to a light characteristic to be projected by the light source.

In another aspect, a lamp is provided that includes a gyroscopic sensor for measuring movements of a lamp, and a controller for correlating the movements of the lamp to commands for changing the characteristics of the light being projected by the lamp. By correlating movements of the lamp to changes in the characteristics of the light being projected by the lamp, the lamp user can change or adjust lighting characteristics of the light being projected by the lamp by applying motions, e.g., rotational movements, to the lamp. In one embodiment, the lamp includes a housing including a light projecting end and a base having an electrical connector for connection with a lamp fixture. The lamp includes a light source positioned at the light projecting end of the housing; and a gyroscopic sensor connected to the housing of the lamp for measuring motion of the lamp. In some embodiments, the gyroscopic sensor is mounted inside the housing for the lamp. The lamp also includes a controller for setting characteristics of light being projected by the light source in response to motions of the lamp being measured by the gyroscopic sensor.

In yet another aspect, a computer program product is provided. In one embodiment, the computer program product includes a non-transitory computer readable storage medium including contents that are configured to cause a lamp to perform a method for controlling lighting. In some embodiments, the method provided by the instructions stored on the non-transitory computer readable storage medium includes measuring at least one type of movement of a lamp with the at least one gyroscopic motion sensor; and converting the at least one type of movement of the lamp measured by the gyroscopic sensor to a characteristic of light from a plurality of light settings corresponding to lamp movements. The method further includes sending a signal to a light source of the lamp including the gyroscopic sensor to project light having the characteristic of light correlated to the movement of the lamp measured by the gyroscopic sensor.

BRIEF DESCRIPTION OF THE DRAWINGS

The following description will provide details of embodiments with reference to the following figures wherein:

FIG. 7 is a table of motions/gestures applied to the lamp and the commands correlated to the motions/gestures for adjusting the characteristics of light being projected by the light source of the lamp, in accordance with one embodiment of the present disclosure.

DETAILED DESCRIPTION

Figure 1:
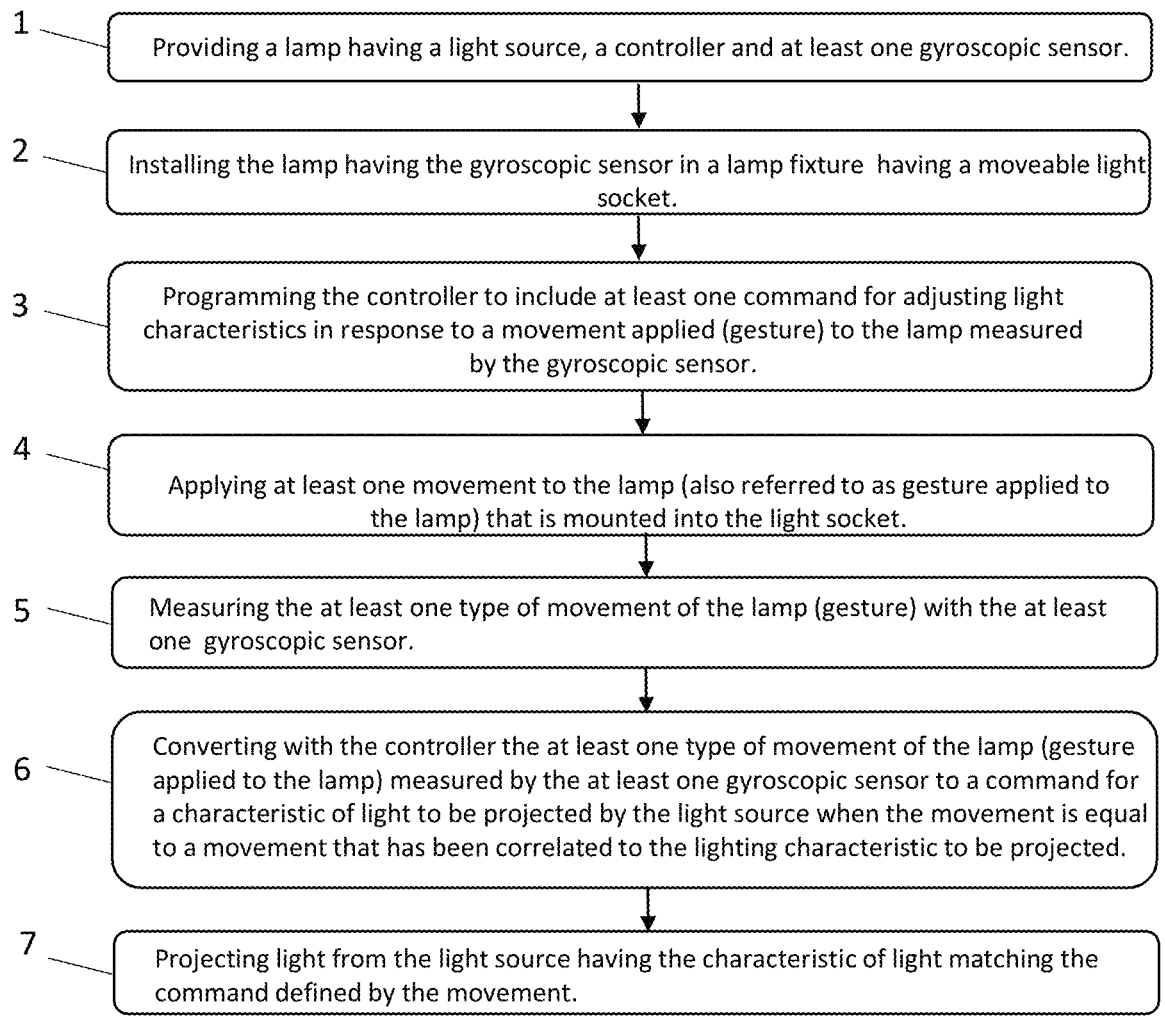
FIG. 1 is a flow diagram showing a method of controlling lighting of a lamp through motions applied to the lamp that are measured with a gyroscopic sensor, in accordance with one embodiment of the present disclosure.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

In some embodiments, the methods, structures and computer program products that are described herein can control lighting parameters, such as color, color temperature and light intensity/dimming, for light being projected by a lamp structure, e.g., bulb including a light source of light emitting diodes (LEDs). The methods, structures and computer program products described herein employ a gyroscopic motion sensor that is integrated with the lamp to measure the motion of the lamp, e.g., rotation motion, and use those motions to control lighting parameters of the light being projected by the lamp.

The methods, structures and computer program products that are described herein can provide new options for lamp operation management by the user. By using gestures, i.e., movements, that are applied to the lamp and measured by the gyroscopic sensor integrated with the lamp, the light source of the lamp may be turned ON or turned OFF; the color of the light projected by the lamp may be adjusted; the color temperature of the light projected by the lamp may be adjusted; and/or the intensity, e.g., degree of dimming, of the light projected by the lamp may be adjusted without any additional external devices or controls to adjust such characteristics of light. The lamps described herein have on/off capability for the light source of the lamp, while the gyroscopic motion sensor is powered independently from the light source of the lamp so that the lamp can actively measure gestures/motions applied to the lamp even when the power to the light source is turned off. More specifically, in some embodiments, the power to the gyroscopic motion sensor of the lamp is not controlled by an on/off switch, such as a two position switch, rocker switch and/or toggle switch employed by the user of the lamp.

As will be described in greater detail below, in some embodiments, the gyroscopic motion sensor equipped lamps, e.g., lamps having light emitting diode (LED) light sources, allow user gesture controls to adjust the characteristics of the light being projected by the lamp. In some embodiments, the gyroscopic motion sensor equipped lamps can be installed in lamp fixtures having a moveable light socket, e.g., the light socket of the lamp may be rotated by tilt, rotation, and/or yaw etc. The gyroscopic motion sensor always being powered, the motion sensor of the lamp can measure motions applied to the lamp through motions applied to the socket cut of the lamp fixture to which the lamp is engaged. Specific motions, i.e., gestures, which are applied to the lamp are set to adjust specific light characteristics of the light projected by the light source of the lamp. Some examples of lighting characteristics controlled by gestures, i.e., motions, applied to the lamp may include powering or powering off the light source of the lamp; changing the color of the light being projected by the light source of the lamp; changing the color temperature of the light being projected by the light source of the lamp; and combinations thereof. Further, the functions executed by the gestures, i.e., motions, applied to the lamp to change the lighting characteristics of light being projected by the light source of the lamp can be programmed and reprogrammed through a microcontroller that is also integrated within the lamp. In some embodiments, the microcontroller may be programmed and/or reprogrammed to interpret position signals taken from the gyroscope that correspond to gestures applied to the lamp and correlate those position signals to an adjustment in the characteristics of light being projected by the light source of the lamp. The methods, structures and computer program products that are provided herein are now described with more detail with reference to FIGS. 1-8.

FIG. 1 is a flow diagram showing a method of controlling lighting of a lamp through motions applied to the lamp that are measured with a gyroscopic sensor. The motions/gestures applied to the lamp that are measured with the gyroscopic sensor to provide commands to the lamp to change lighting characteristics of the light projected by the lamp's light source. The changes to lighting characteristics that can be signaled through motions applied to the lamp can include turning the lamp on and/or off, changing the color of light projected, changing the color temperature of the light projected and/or changing the intensity, e.g., degree of dimming, of the light projected by lamp. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium, which can be non-transitory, that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). A hardware processor may be employed to execute the one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring to step 1 of FIG. 1, the method can begin with providing a lamp with a light source, a controller and at least one gyroscopic sensor. The term "lamp" refers to any device for producing light. In some examples, the lamp may be a bulb or tube, e.g., composed of plastic and/or glass, that emits light produced by electricity, e.g., a light emitting diode (LED) and/or fluorescent bulb. It is noted that the light emitting diode (LED) and the fluorescent bulb are only some examples of light bulb types that can function as the lamp in accordance with the methods, structures, and computer program products of the present disclosure. In some other embodiments, the type of bulb that is being employed in the lamp may be an incandescent type bulbs, halogen type bulbs, compact fluorescent type bulb and combinations thereof. It is noted that the type of bulb is not limited to only the aforementioned examples as other lamps used in home applications, office applications, commercial applications, education applications and other similar applications are also applicable to the methods, structures, and computer program products of the present disclosure.

Figure 2A:
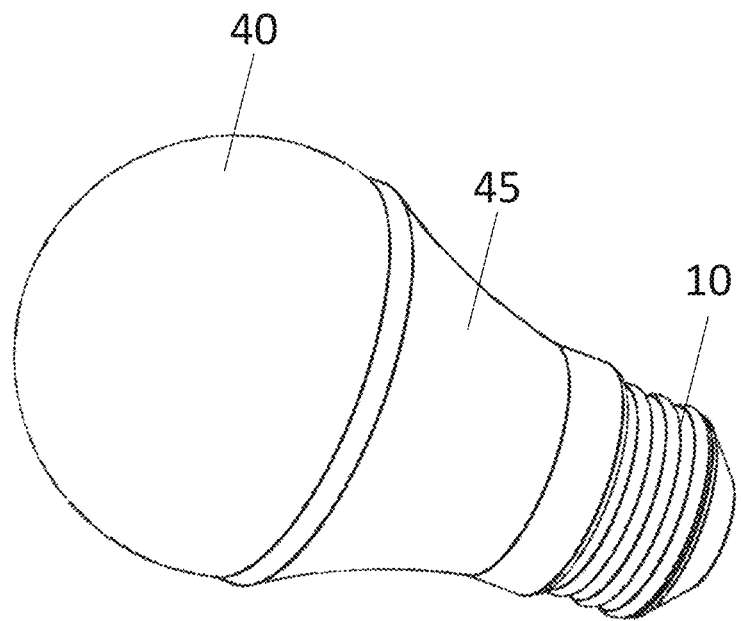
FIG. 2A is a perspective view of a lamp including a gyroscopic sensor for measuring motions applied to the lamp, wherein the motions are correlated to light settings for the characteristics of light being projected by the lamp, in accordance with one embodiment of the present disclosure.
Figure 2B:
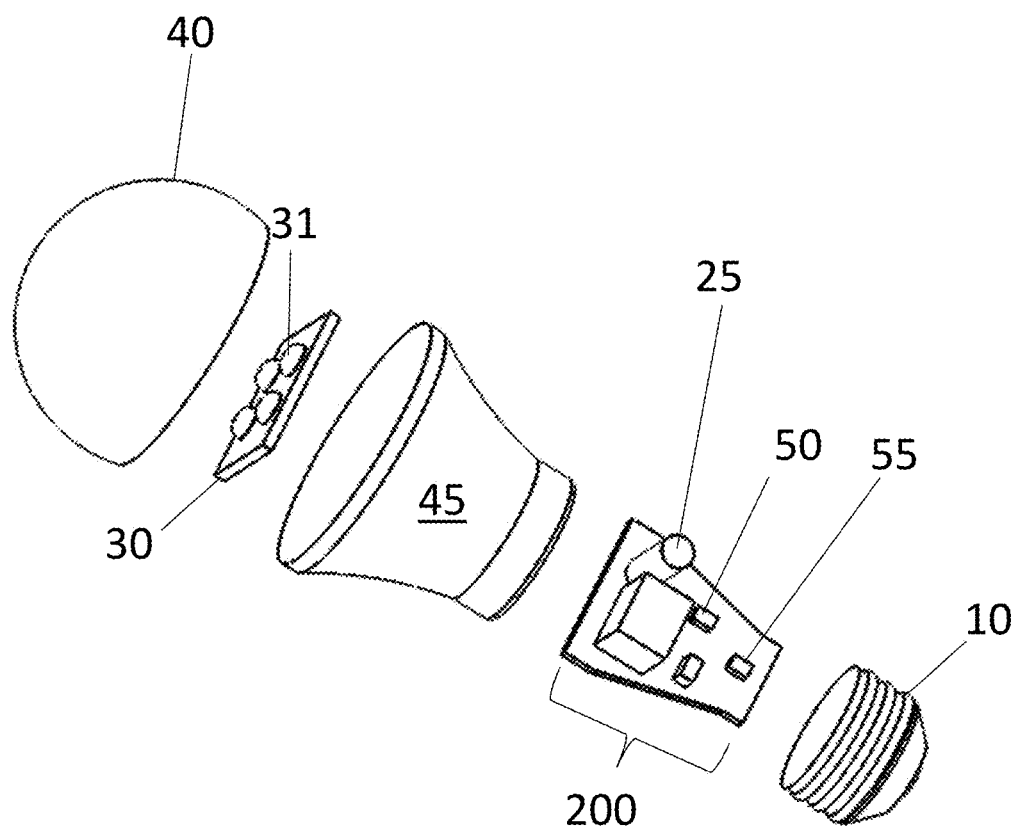
FIG. 2B is an exploded view of the lamp depicted in FIG. 2A.

FIGS. 2A and 2B depict one embodiment of a lamp 100 including a gyroscopic sensor 25 for measuring motions applied to the lamp 100, wherein the motions of the lamp measured by the gyroscope sensor 25 are correlated to light settings for the characteristics of light being projected by the lamp 100. Although FIGS. 2A and 2B depict a lamp 100 composed of a light emitting diode (LED) type light source, other lamps are equally applicable to the methods described herein. Further, the LED depicted in FIGS. 2A and 2B illustrates only one example of an LED type lamp, wherein other LEDs not depicted in FIGS. 2A and 2B, which can include other components than those illustrated, or omit some of the components specifically depicted herein, is equally applicable to the methods, structures, and computer program products of the present disclosure.

Referring to FIG. 2B, in some embodiments, the light source for the lamp 100 is provided by light emitting diodes (LEDs) 31 that are arranged on an LED panel 30. The LED panel 30 may include several surface mount device (SMD) light emitting diodes (LEDs) that are arranged on a piece of printed circuit board (PCB) 32 to form the LED array that provides the light from the lamp 100. Standard household LED bulbs will contain anywhere from a single LED 31 to arrays of 5 to 10 LEDs.

The LEDs 31 of the lamp are capable of adjusting the color of the light they emit. The term "color" denotes a phenomenon of light or visual perception that can enable one to differentiate objects. Color may describe an aspect of the appearance of objects and light sources in terms of hue, brightness, and saturation. Some examples of colors that may be suitable for use with the method of controlling lighting in accordance with the methods, structures and computer program products described herein can include red (R), orange (O), yellow (Y), green (G), blue (B), indigo (I), violet (V) and combinations thereof, as well as the numerous shades of the aforementioned families of colors. It is noted that the aforementioned colors are provided for illustrative purposes only and are not intended to limit the present disclosure as any distinguishable color may be suitable for the methods, systems and computer program products described herein. In some embodiments, the amount of the variations in color including shades and mixtures of the aforementioned primary colors that provide the ROYGBIV spectrum that can be projected by the light source of the lamp 100, e.g., LEDs 31, may be equal to 1, 5, 10, 15, 20, 30, 40, 50 and 100, and any range for the number of color shades in which one of the aforementioned examples provides a lower limit to the range and one of the aforementioned examples provides an upper limit to the range, as well as any value within those ranges.

The LEDs 31 of the lamp are capable of adjusting the "color temperature" of the light they emit. The color temperature of a light source is the temperature of an ideal black-body radiator that radiates light of a color comparable to that of the light source. Color temperature is a characteristic of visible light that has applications in lighting, photography, videography, publishing, manufacturing, astrophysics, horticulture, and other fields. Color temperature is meaningful for light sources that do in fact correspond somewhat closely to the radiation of some black body, i.e., those on a line from reddish/orange via yellow and more or less white to blueish white. Color temperature is conventionally expressed in kelvins, using the symbol K, a unit of measure for absolute temperature. Color temperatures over 5000 K are called "cool colors" (bluish white), while lower color temperatures (2700-3000 K) are called "warm colors" (yellowish white through red). "Warm" in this context is an analogy to radiated heat flux of traditional incandescent lighting rather than temperature. The spectral peak of warm-colored light is closer to infrared, and most natural warm-colored light sources emit significant infrared radiation. The LEDs 31 of the lamps provided by the present disclosure in some embodiments can be adjusted from 2K to 7K.

The LEDs 31 of the lamp 100 are capable of adjusting the light intensity/dimming of the light they emit. In some examples, dimming or light intensity may be measured using lux. In some embodiments, the dimming or light intensity adjustment of the LEDs 31 can provide for adjusting lighting between 100 lux to 1000 lux. For example, lighting for office work may be comfortably done at a value between 250 lux to 500 lux. For greater intensity applications, such as work areas that involve drawing or other detail work, the intensity of the lamps are illuminated to a range within 750 lux to 1,000 lux.

In some embodiments, the LEDs 31 project light through a globe 40 that the LED panel 30 is positioned behind. In some examples, due to the brightness of SMD LEDs, a frosted globe 40 is used to more evenly disperse the light produced. The use of the frosted globe 40 can contribute to the production of light from the LED bulbs that looks and feels more like traditional frosted white incandescent bulbs. The globe 40 can be made of plastic, which is resistant to crack formation or shattering. The globe 40 can also be composed of glass.

Opposite the globe 40, a heatsink 45 may be present to position the LED panel 30 between the globe 40 and the heatsink 45. The heatsink 45 is generally composed of a thermally conductive material, such as a piece of aluminum, having a geometry to provide sufficient surface area for heat dissipation with the atmosphere. In some embodiments, the heatsink 45 includes fins that spread out from the center, which are used to disperse heat from electrical components. In some examples, the heatsink 45 that is employed in the LED bulbs 100 are pulling heat away from the driver 55, because the conversion of alternating current (AC) to direct current (DC) power generates heat.

Referring to FIGS. 2A-2B, the driver 55 may be a component of an electronics package 200 that is present between the LED panel 30 and a base portion 10 of the bulb 100 that engages, i.e., screws into, the socket of a lamp fixture 300. The driver 55 may be enclosed in the heat sink 45. LED lamps 100, such as the one depicted in FIGS. 2A and 2B can be designed as direct replacement for existing bulbs, such as incandescent bulbs. In some embodiments, the hot contact is at the bottom of the base portion 10, while the threaded portion that can provided for engagement to the light socket of a lamp fixture 300 is neutral. The base portion 10 includes an electrical connector that connects the electrical contacts on the base portion 10 to the driver 55, e.g., 12V driver, which powers the LEDs 31 on the LED panel 30. The electrical contact can be provided by a couple of soldered contacts.

Figure 3:
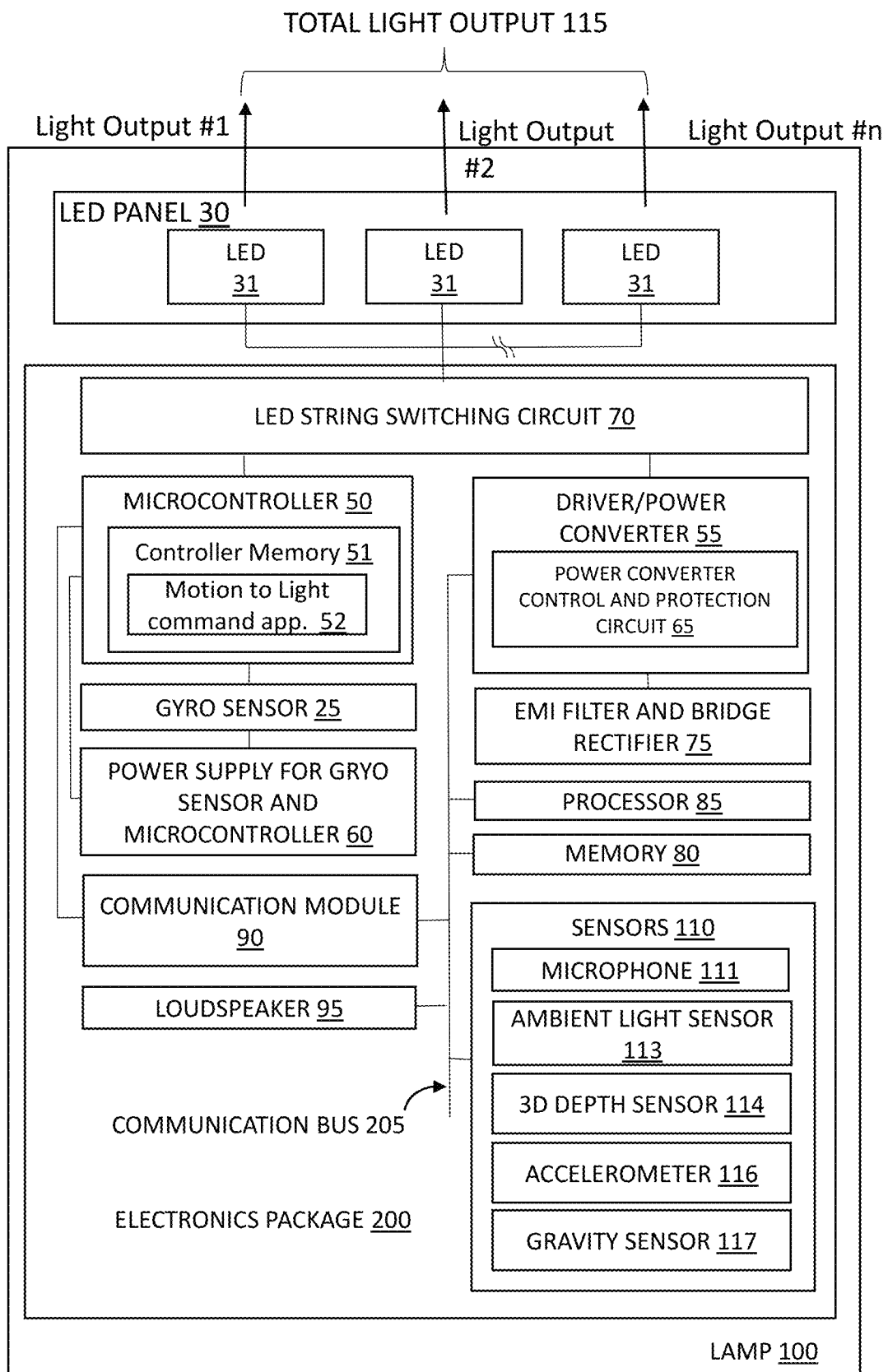
FIG. 3 is an illustration (block diagram) of a lamp including a gyroscopic sensor for measuring motions applied to the lamp, wherein the motions are correlated to light settings for the characteristics of light being projected by the lamp, in accordance with one embodiment of the present disclosure.

FIG. 3 is an illustration (block diagram) of a lamp 100 including a gyroscopic sensor 25 for measuring motions applied to the lamp, wherein the motions applied to the lamp 100 are correlated to light settings for characteristics of light to be projected by the lamp 100. FIG. 3 provides greater detail for some aspect of the electronics package 200 that is also depicted in FIGS. 2A and 2B. In addition to the driver 55, the electronics package 200 may include at least one motion sensor, i.e., gyroscopic motion sensor 25, and at least one controller 50 for setting characteristics of light being projected by the light source in response to motions of the lamp being measured by the gyroscopic sensor 25. The driver 55, gyroscopic sensor 25 and controller 50 may each be integrated, i.e., either by formed on, formed in, or electrically connected thereto, to a printed circuit board (PCB) of the electronics package 200.

Still referring to FIGS. 2B and 3, the driver 55 may be a component of an electronics package 200 housed within the lamp 100. The driver 55 of the electronics package 200 converts AC electricity supplied to a room in which the lamp 100 is present into the (usually 12 v) DC used by LEDs 31. The driver 55 may also be referred to as a power converter. In addition to converting the AC power to rectified DC power, the driver 55 may also adjust the voltage and/or current to provide the appropriate voltage and/or current to power the LEDs 31. In some embodiments, the driver 55 is a constant current regulator that regulates current to a set value. In some embodiments, the driver/converter 55 has a role in determining the power quality of the lamp 100, such as the total harmonic distortion and the power factor.

Gyroscopic sensors 25 measure rotation, which is a measure of angular motion. In some embodiments, the gyroscopic sensors 25 of the present disclosure may function to measure angular motion, e.g., rotational motion. The gyroscopic sensors 25 used in the lamp 100 may be provided by any type of gyroscopic sensor, such as piezoelectric gyroscopic sensors, wine glass resonator gyroscopic sensors, cylindrical resonator gyroscopic sensors, tuning fork gyroscopic sensors, vibratory wheel gyroscope sensors, disc resonator gyroscopic (DRG) sensors, foucault pendulum gyroscopes and variations thereof, as well as combinations thereof. In some embodiments, the gyroscopic sensor 25 may be formed using semiconductor and microelectronic processing, such as photolithography. In some embodiments, the gyroscopic sensors 25 that may be used in the lamp 100 may be printed onto circuit boards, i.e., PCBs, and may be referred to as Micro-Electro-Mechanical Systems (MEMS) gyroscopic sensors. The MEMs gyroscopic sensors may employ type IV semiconductor materials, such as silicon (Si). Examples of MEMs gyroscopic sensors 25 that can be suitable for use with the lamps 100 that are described herein can include tuning fork gyroscopic sensors, vibratory wheel gyroscope sensors, disc resonator gyroscopic (DRG) sensors, foucault pendulum gyroscopes and variations thereof, as well as combinations thereof.

The gyroscopic sensor 25 may be one of a single axis gyroscopic sensor, a dual axis gyroscopic sensor, a three axis gyroscopic sensor, a six axis gyroscopic sensor, a nine axis gyroscopic sensor or a combination thereof.

Figure 4:
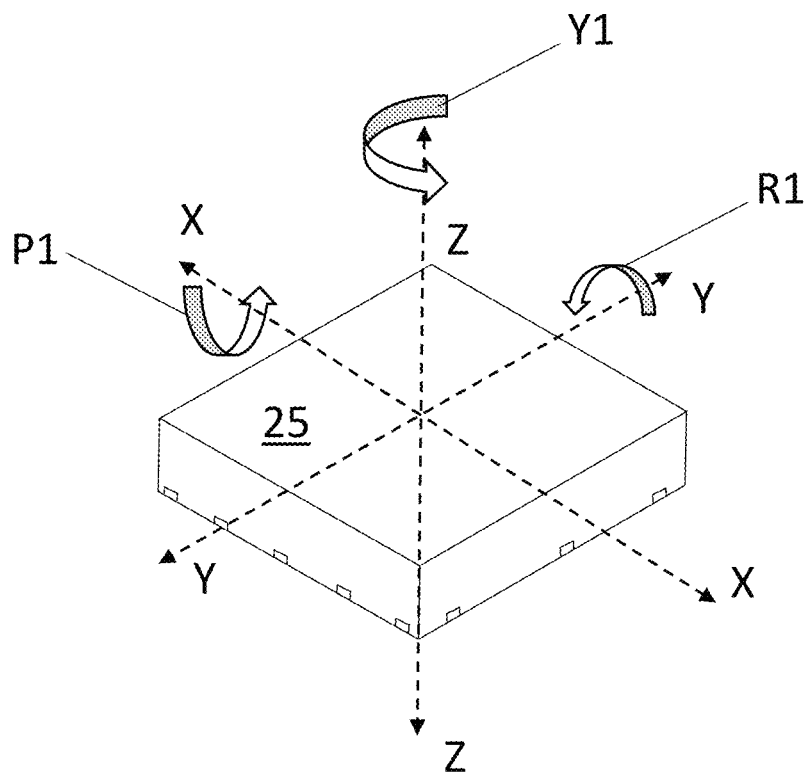
FIG. 4 is a perspective view of a gyroscopic motion sensor having referential axis in which movement of the gyroscopic motion sensor about the referential axis can be employed as a mechanism for lighting controls, in accordance with one embodiment of the present disclosure.

In some embodiments, gyroscopes can measure movement around three axes with three sensors—one each for pitch P1, yaw Y1, and roll R1. FIG. 4 depicts one embodiment of a gyroscopic motion sensor 25 having referential axis X-X, Y-Y, Z-Z, in which movement of the gyroscopic motion sensor 25 about the referential axis can be employed as a mechanism for lighting controls. The rotation around the pitch axis for which a gyroscopic sensor 25 can measure movement is identified in FIG. 4 by reference identifier P1. The rotation P1 for pitch is around the X-X axis. The rotation around the roll axis for which a gyroscopic sensor 25 can measure movement is identified in FIG. 4 by reference identifier R1. The rotation R1 for roll is around the Y-Y axis. The rotation around the yaw axis for which a gyroscope can measure movement is identified in FIG. 4 by reference identifier Y1. The rotation Y1 for yaw is around the Z-Z axis.

In some example embodiments, gyroscopic sensor(s) 25 may be configured to determine the orientation and/or rate of rotation of the lamp 100. In some embodiments, the gyroscopic sensor 25 may measure the rate of rotation of the lamp 100 as a vector, such as a vector $\vec{R}$, such that $\vec{R}=<R_{R1}, R_{P1}, R_{Y1}>$, where each component is the rate of rotation around an inertial axis of the device, in terms of radians per second (rad/s). In such an example case, each component of {Right arrow over (R)} may be unconstrained, and if the device is at ideal rest, $\vec{R}$, would be equal to <0, 0, 0>. In some examples, the expression of a rotational measurement by the gyroscopic sensor 25 as a vector may be associated with a command for setting a light parameter of the lamp 100. For example, a first vector corresponding to a first rotational movement of the lamp 100 may be correlated to at least one of whether the light source of the lamp 100, e.g., LEDs 31, is to be powered on, i.e., turned ON; a second rotation movement of the lamp 100 may be correlated to a command to turn the lamp 100 off, i.e., turned OFF; a third rotational movement of the lamp 100 may be correlated to a command for the lamp 100 to change colors, e.g., cycle through the available colors for selection by the user for emission of color; a fourth rotation movement of the lamp 100 may be correlated to a command for the lamp 100 to change color temperature, e.g., cycle through the available colors for selection by the user for emission color; and a fifth rotational movement of the lamp 100 may be correlated to a command for the lamp 100 to change light intensity/dimming level.

In some embodiments, the gyroscopic sensor 25 may be a three axis gyroscopic sensor that can provide three output signals corresponding to the orientation of the lamp 100, e.g., the orientation of the lamp 100 as installed in a light fixture 300, in terms of its position along an x-axis, y-axis and z-axis or a three-dimensional Cartesian coordinate system, as further described below with reference to FIGS. 5A-5D. The outputs from the gyroscopic sensor 25 may be digital or analog. The gyroscopic sensor 25 may have an adjustable sensitivity that can be set by the designer or user of the lamp 100 based upon the requirements for the operation of the lamp 100. The gyroscopic sensor 25 may be powered by a power source that is independent of the power source for the lamp 100. In this example, the gyroscopic sensor 25 can always be monitoring the orientation of the lamp 100 whether the lamp 100, i.e., the light source of the lamp 100, e.g., LEDs 31, is powered, i.e., ON, or not powered, i.e. OFF.

Figure 6:
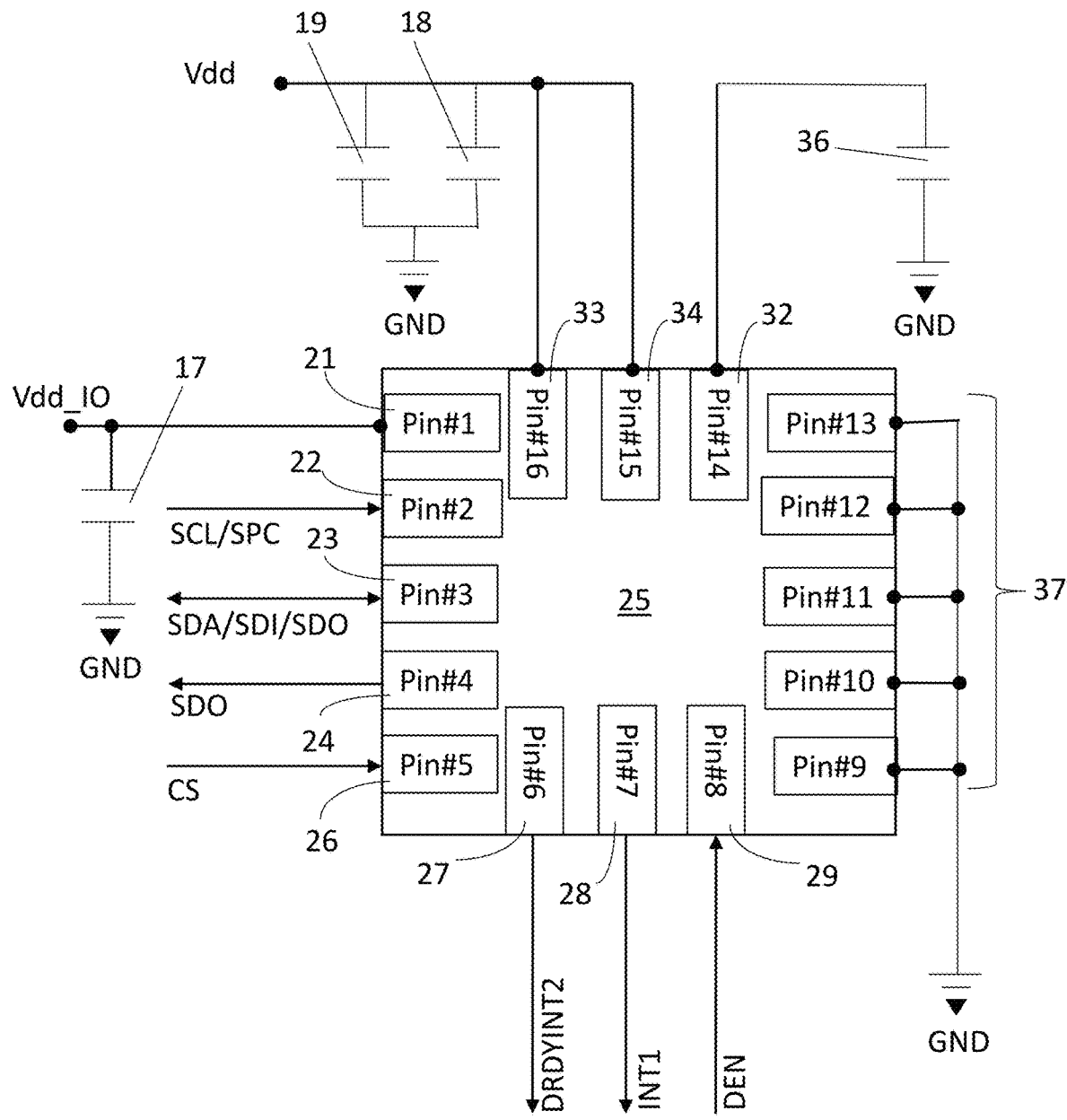
FIG. 6 is a circuit diagram of a gyroscopic sensor for use with a lamp that projects light having characteristics that are adjusted and/or set by motions applied to the lamp and measured by the gyroscopic sensor.

FIG. 6 is a circuit diagram of one example of a gyroscopic sensor 25 for use with a lamp 100 that projects light having characteristics that are adjusted and/or set by motions applied to the lamp and measured by the gyroscopic sensor 25. It is noted that the gyroscopic sensor 25 that is depicted in FIG. 6 provides only one example of a sensor for use with the methods, structures and computer program products that are described herein, and it is not intended that the present disclosure be limited to only this example. In some embodiments, the gyroscopic sensor 25 that is depicted in FIG. 6 includes a sensing element, which can be an MEMS gyroscope; and an integrated circuit (IC) interface that is able to provide measured angular rate to the microcontroller 50 through digital interface, e.g., inter integrated circuit ($I^2C$) or serial peripheral interface (SPI). One example of a gyroscope sensor 25 that is consistent with the circuit diagram depicted in FIG. 6 is MEMS motion sensor L3GD20H available from STMicroelectronics N.V., which has a full scale of +/−245 dps/+/−500 dps/+/−2000 dps, and is capable of measuring rates with a user selectable bandwidth. It is noted that MEMS motion sensor L3GD20H is only one example of a gyroscopic sensor 25 for use with the methods, structures and computer program products that are described herein, and it is not intended that the present disclosure be limited to only this example.

In FIG. 6, pin #1 (identified by reference number 21) (Vdd_IO) is the power supply for the input/output I/O pins of the gyroscopic sensor 25. Pin #1 may be connected to a power supply that is specific for the gyroscopic sensor 25 and the microcontroller 50, i.e., the power supply that is connected to pin #1 of the gyroscopic sensor 25 can be separate from the power supply for the lamp 100, e.g., LEDs 31 of the lamp. In this example, the gyroscopic sensor 25 can always be monitoring the lamp 100, i.e., the light source of the lamp 100, e.g., LEDs 31, is powered, i.e., ON, or not powered, i.e. OFF. In some embodiments, pin #1 may also be connected to capacitor 17, e.g., a 100 nF capacitor, as depicted in FIG. 6.

Pin #2 (identified by reference number 22)(SPL/SPC) may be connected to a serial clock (SCL) for the inter integrated circuit ($I^2C$) interface, or the serial close port (SPC) for the serial peripheral interface (SPI). Pin #3 (identified by reference number 23)(SDA/SDI/SDO) may be connected to the inter integrated circuit (PC) data (SDA), or the serial data input (SDI) for the serial peripheral interface (SPI), or a 3-wire interface serial data output (SDO). Pin #4 (identified by reference number 24)(SDO) may be the serial port output (SDO) for the serial peripheral interface (SPI), or for the inter integrated circuit ($I^2C$) interface providing a less significant bit for the device address (SAO). Pin #5 (identified by reference number 26)(CS) is for inter integrated circuit ($I^2C$) interface/serial peripheral interface (SPI) mode selection. Pin #6 (identified by reference number 27) (DRDY/INT2) is for data ready/First In First Out (FIFO) interrupt. Pin #7 (identified by reference number 28) (INT1) is for programmable interrupt. Pin #8 (identified by reference number 29)(DEN) is for gyroscope enable. Pin #2-#8 (identified by reference numbers 21, 22, 23, 24, 26, 27, 28 and 29) may be in electrical communication with the controller 50.

Referring to FIG. 6, Pin #'s 9, 10, 11, 12 and 13 (collectively identified by reference number 37) are connected to ground (GND). Pin #14 (identified by reference number 32) of the gyroscopic sensor 25 can connect to a ceramic capacitor 36 to ground (GND). The ceramic capacitor 36 may be a 10 nF capacitor. Pin #16 (identified by reference number 33)(Vdd) is for a power supply. Pin #16 may be connected to a power supply that is specific for the gyroscopic sensor 25 and the microcontroller 50, i.e., the power supply that is connected to pin #16 of the gyroscopic sensor 25 can be separate from the power supply for the lamp 100, e.g., LEDs 31 of the lamp. In this example, the gyroscopic sensor 25 can always be monitoring the lamp orientation whether the lamp 100, i.e., the light source of the lamp 100, e.g., LEDs 31, are powered, i.e., ON, or not powered, i.e. OFF. In some embodiments, pin #6 may also be connected to at least one capacitor, e.g., a 100 nF capacitor 19 and or a 10 μF capacitor 18, as depicted in FIG. 6.

It is noted that the pin layout depicted in FIG. 6 is only one example of a pin layout for a gyroscopic sensor 25 for use with the methods, structures and computer program products that are described herein, and it is not intended that the present disclosure be limited to only this example.

Referring to FIGS. 2A-3, the controller 50 for setting characteristics of light being projected by the light source in response to motions of the lamp 100 being measured by the gyroscopic sensor 25 may hereafter be referred to as a microcontroller 50. In some embodiments, the microcontroller 50 can include at least one microprocessor, i.e., a computing device, that present can be present in an integrated circuit that can be is dedicated to perform tasks and execute specific applications. In addition to the processor, i.e., hardware processor, the microcontroller 50 can contain memory (controller memory 51 as depicted in FIG. 3), as well as programmable input/output peripherals. The memory 51 of the microcontroller 50 can include instructions for setting characteristics of light being projected by the light source, e.g., LEDs 31 of the LED panel 30, in response to motions of the lamp 100 being measured by the gyroscopic sensor 25. The instructions for setting characteristics of light being projected by the light source in response to the motions of the lamp 100 being measured by the gyroscopic sensor 25 can be provided by a module of memory to a motion to light command application 52. The motion to light command application 52 correlates a measurement of rotation measured by the gyroscopic sensor 25 to commands sent by the microcontroller 50 to change the lighting characteristics for light being emitted by the LEDs 31 of the lamp 100, e.g., a signal to turn the lamp ON, a signal to turn the lamp OFF, a signal to change the color of light emitted by the LEDs 31, a signal to change the color temperature of light emitted by the LEDs 31 and/or a signal to change the light intensity/dimming effects by the LEDs 31.

In one example, the motion to light command application 25 of the microcontroller 50 can be programmed to convert the input signals from the gyroscopic sensor 25 into corresponding output signal to the control circuit of the power converter stage that controls the current flowing into the LED strings. The gyroscopic sensor 25 in the lamp 100 senses the gesture movements applied to the lamp 100 and generates angular rate of motion information for yaw Y1, pitch P1 and roll R1. The above mentioned angular rate of motion information types can be communicated to the microcontroller 50 through I2C or SPI bus. The microcontroller 50 can interpret the received digital data from the gyroscopic sensor 50 and converts that information into the required analog/digital signal that the power converter that is controlling the driver currents into the LEDs 31 can interpret. For example when the microcontroller 50 receives an input that indicates rotate forward pitch motion, the microcontroller 50 may turn the lamp ON by generating a signal on its I/O terminal that enables the switching controller of the power converter stage. The power converter can then supply the required current into the LED strings and the lamp 100 will turn ON. Similarly, rotate backward pitch motion may cause the microcontroller 50 to generate a signal on its I/O terminal that disable the switching controller. In some embodiments, this can cause the power converter to turn OFF the current into the LEDs 31, and hence turn OFF the lamp 100.

In a similar manner as described above, roll left (Clockwise (CW) motion signal from the gyroscopic sensor 25 to the microcontroller 50 may cause it to generate pulse width modulation (PWM) signals that drives the Red, Blue and Green string of LEDs 31 to generate the required color. In some embodiments, this can be done by controlling the duty cycle of the current flow into each LED string. In some embodiments, roll right (counterclockwise (CCW)) motion may cause the microcontroller 50 to generate the PWM or analog signals that drive the LED strings to produce the required color temperature.

In some embodiments, a Yaw Left (Clockwise (CW) motion signal from the gyroscopic sensor 25 to the microcontroller 50 may cause it to generate Analog or Digital signal that can increase the amount of current in the LED strings, and thus make the lamp 100, i.e., LEDs 31, glow bright. In one embodiment, a Yaw Right (Anticlockwise) signal may cause the microcontroller 50 to reduce the current flow into the LED strings and thus dim the light output from the LEDs 31 of the lamp 100. The output signal can control the current going into the LEDs 31 of the LED panel 30. In some embodiments, the output signal that controls the current going to the LED panel 30 can carry out controls functions. Examples of the control functions that can be controlled by the output signal include turning the lamp 100 to an ON setting, i.e., to provide illumination (light); turning the lamp 200 to an OFF setting, i.e., to discontinue the emission of light; increasing or decreasing light intensity (decreasing light intensity is lamp dimming); increasing or decreasing light color temperature; and/or adjusting the color of the light being emitted by the lamp 100, i.e., adjusting the color of the light emitted by the LEDs 31 of the lamp 100. It is noted that the aforementioned examples of control functions are provided for illustrative purposes only, and are not intended to limit the present disclosure, as other control functions for characteristics of light to be emitted from the LEDs 31 of the LED panel 30 are equally applicable to the methods, structures and computer program products that are described herein.

It is noted that the electronics package 200 may include additional components than the driver 55 (driver/power converter 55), microcontroller 50 and the gyroscopic sensor 25 that have been described above. In some embodiments, the electronics package 200 may also include an EMI filter and bridge rectifier 75 (collectively referred to as EMI filter 75); a power converter control and protection circuit 65; a power supply for the gyroscopic sensor and microcontroller 60; and a light emitting diode (LED) switching circuit 70. The electronics package 200, as well as additional features of the lamp 100 are now described with greater detail with reference to FIG. 3.

FIG. 3 is a block diagram further depicting an exemplary lamp 100, as depicted in FIGS. 2A and 2B, that through motions measured by the gyroscopic sensor 25 can change lighting effects, performance and characteristics of the lamp 100, such as ON/OFF functioning, lighting color, lighting color temperature and/or light intensity/dimming characteristics.

As can be seen, lamp 100 may include one or more light sources, e.g., LEDs 31, that each provide corresponding light output. The number n of light sources for a given lamp 100 can be customized as desired for a given target application or end-use. The light sources and componentry of lamp 100 will be described in more detail herein. However, note that lamp 100 may include additional or alternative componentry based on the specific configuration used.

As noted above, in some embodiments, such as those depicted in FIGS. 2A-3, the light source may be provided by LEDs 31, but other light sources may either be substituted for the LEDs 31, or used in combination with the LEDs 31, such as organic light-emitting diodes (OLEDs), a polymer light-emitting diode (PLED), and/or a combination of any one or more thereof. In some embodiments, a given solid-state emitter may be configured for color-tunable emissions. For instance, in some cases, a given light source may be a multi-color (e.g., bi-color, tri-color, etc.) semiconductor light source configured for a combination of emissions, such as: (1) red-green-blue (RGB); (2) red-green-blue-yellow (RGBY); (3) red-green-blue-white (RGBW); (4) dual-white; and/or (5) a combination of any one or more thereof. The quantity and arrangement of lighting sources utilized for the lamp 100 may be customized as desired for a given target application or end-use.

The gyroscopic sensor 25 depicted in FIG. 3 has been described above with reference to FIGS. 2A-2B, 4 and 6. In one example, the gyroscopic sensor 25 may be a three axis gyroscopic sensor 25, in which the sensor measures rotational measurements around the X-X axis, i.e., pitch P1, the Y-Y axis, i.e., rotation R1, and the Z-Z axis, i.e., yaw Y1, as illustrated in FIG. 4. Referring to FIGS. 3 and 6, the gyroscopic sensor 25 may be connected to the microcontroller 50, and each of the gyroscopic sensor 25 and the microcontroller 50 may be powered by a power source that is separate from the power source that powers the light source, e.g., LEDs 31, of the lamp 100.

Referring to FIG. 3, the microcontroller 50 is electrical communication with the gyroscopic sensor 25. The microcontroller 50 functions to receive lamp motion measurements, i.e., measurements of rotational lamp motions, measured by the gyroscopic sensor 25 as input data, and convert those lamp motions into a signal for adjusting light properties of the lamp 100, such as to turn the lamp ON or OFF, change the color of light emitted by the lamp 100, change the color temperature of the light emitted by the lamp 100, and/or change the intensity/dimming of the light emitted by the lamp 100.

As described above with reference to FIGS. 2A and 2B, the microcontroller 50 may include a processor, e.g., hardware processor, and memory (hereafter referred to as controller memory 51). The controller memory 51 can be of any suitable memory type (e.g., RAM and/or ROM, or other suitable memory) and size, and in some cases may be implemented with volatile memory, non-volatile memory, or a combination thereof. A processor for the microcontroller 50 may be configured, for example, to perform operations associated with the lamp 100 or a given light source, e.g., LED 31, in accordance with the instructions stored on the modules of the control memory 51 for the motion to light command application 52. In accordance with some embodiments, a given module of memory, e.g., module of the controller memory 51 for the motion to light command application 52, can be implemented in any suitable standard and/or custom/proprietary programming language, such as, for example: (1) C; (2) C++; (3) objective C; (4) JavaScript; and/or (5) any other suitable custom or proprietary instruction sets, as will be apparent in light of this disclosure. The modules of memory 51 including the motion to light command application 52 can be encoded, for example, on a machine-readable medium that, when executed by a processor, carries out the functionality of lamp 100 to adjust the lighting characteristics of light source, e.g., LEDs. The computer-readable medium may be, for example, a hard drive, a compact disk, a memory stick, a server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic. Some embodiments can be implemented with a microcontroller having input/output capability (e.g., inputs for receiving user inputs; outputs for directing other components) and a number of embedded routines for carrying out the device functionality. In a more general sense, the functional modules of memory 51 (e.g., one or more applications, including the motion to light command application 52 discussed throughout) can be implemented in hardware, software, and/or firmware, as desired for a given target application or end-use.

In accordance with some embodiments, the controller memory 51 of the microcontroller 50 within the lamp 100 may have stored therein (or otherwise have access to) one or more applications. In some instances, the light source, e.g., LEDs 31, of the lamp 100 may be configured to receive input, for example, via one or more applications 52, e.g., the motion to light command application 52, stored in the memory 51 of the microcontroller. For instance, the motion to light command application 52 may allow a user to program or configure a lamp 100 to adjust project light having characteristics, such as the light color, light intensity/dimming, or light color temperature, in response to motions applied to the lamp 100 while engaged to a light fixture 300, wherein the motions are measured by the gyroscopic sensor 25 within the lamp 100. As noted above, the gyroscopic sensor 25 can measure rotational motion applied to the lamp 100, which can be expressed in vectors and/or can be expressed in values having units of radians/second. The gyroscopic sensor 25 can take measurements for pitch P1, rotation R1 and yaw Y1, as depicted in FIG. 4. These measurements of rotation motion measured with the gyroscopic sensor 25 may function as the input to the motion to light command application 52, stored in the controller memory 51 of the microcontroller 50. Depending upon the type of motion measured by the gyroscopic sensor 25 that provides the input to the motion to light command application 52, the motion to light command application 52 may then send a signal employing the at least one processor of the microcontroller 50 to adjust the lighting characteristics of the LEDs 31 according to a series of instructions correlating rotational motions measured by the gyroscopic sensor 25 to lighting characteristic adjustments in response to the motion measured by the gyroscopic sensor 25.

FIG. 7 includes a table of motions/gestures applied to the lamp 100 and the commands correlated to the gesture for adjusting the characteristics of light being projected by the light source of the lamp 100. The commands included in FIG. 7 can be stored as instructions in the light command application 52 of the microcontroller memory 51 correlating rotational motions measured by the gyroscopic sensor 25 to the characteristics of light emitted by the light source, LED 31. The commands, i.e., light ON/light OFF, light color adjustment (cycle), light intensity adjustment (cycle), and/or light color temperature adjustment, that are listed in FIG. 7 are only one example of commands signaled from the microcontroller 50 for adjusting light characteristics in response to motions/gestures applied to the lamp 100. It is not intended that the present disclosure be limited to only this example list of measured rotational movements measured by the gyroscopic sensor 25 and the correlated adjustments to lighting characteristics emitted from the lamp 100.

Referring to FIG. 3, in some embodiments, the signal produced by the at least one microcontroller 50 to adjust light properties being emitted by the lamp 100, e.g., adjust light properties being emitted by the LEDs, is sent to an LED string switching circuit 70. The LED string switching circuit 70 is a circuit that can turn ON/OFF the LEDs 31 based on the control input, e.g., received from the microcontroller 50, at a given frequency. In some embodiments, the ON/OFF times of the LED string switching circuit 70 determine the duty cycle of operation of each LED string, i.e., LEDs 31. In some embodiments, the duty cycle of operation of each LED string, i.e., LEDs 31, can determine the color of light being emitted by the LEDs 31. In some embodiments, the duty cycle of operation of each LED string, i.e., LEDs 31, can determine at least one of the light intensity (dimming) and the light color temperature.

Still referring to FIG. 3, the microcontroller 50 and the gyroscopic sensor 25 may also be connected to a power supply for the gyro sensor and the microcontroller 60. It is noted that the power supply for the gyro sensor and the microcontroller 60 can be separate from the power supply for the light source that is powering the LEDs 31 through the driver/power converter 55. The power supply for the gyro sensor and microcontroller 60 is separate from the driver/power converter 55 to allow that a power source is available to the microcontroller 50 and the gyroscopic sensor 25 even when power to the lamp 100 is OFF, i.e., the lamp 100 is turned OFF. In one example, in which the gyroscopic sensor 25 is consistent with the example gyroscopic sensor depicted in FIG. 6, the power supply for the gyro sensor 60 is connected to pin #1 (identified by reference number 21) (Vdd_IO) for the input/output I/O pins of the gyroscopic sensor 25.

In some embodiments, the power supply for the gyro sensor and the microcontroller 60 is a battery. A battery is a source of electricity. In some embodiments, the battery may also be referred to as a galvanic battery or a voltaic battery. In some examples, the battery may be a combination of two or more cells that are electrically connected to work together to produce electrical energy. Examples of battery types that are suitable for the power supply for the gyro sensor and the microcontroller 60 may be selected from alkaline type batteries, zinc-carbon type batteries, lead-acid type batteries, mercury type batteries, lithium ion type batteries, lithium oxide type batteries, silver oxide type batteries and combinations thereof. In some embodiments, the power supply for the gyro sensor and the microcontroller 60 is rechargeable.

The power supply for gyro sensor and microcontroller 60 is separate from the power source that provides power to the lamp 100, i.e., is separate from the power source that enters the lamp 100 through the base connector 10. The power supply for the gyro sensor and microcontroller 60 is separate from the power source that is converted to DC current from AC current by the driver 55 (driver/power converter 55), in which the conversion from AC current to DC current is assisted by at least the EMI filter and bridge rectifier 75, and the power converter control and protection circuit 65.

In some embodiments, the driver/power converter 55 is the power converter for powering the LEDs 31, and is therefore in connection with the LED string switching circuit 70. This converter can convert the rectified DC voltage into the appropriate voltage and current required by the LEDs 31. In some embodiments, this is a constant current regulator that regulates the current to a set value. The converter can have a role in determining the power quality parameters of the lamp 100 like the total harmonic distortion (THD) and power factor. The power converter and protection circuit 65 can provide constant current control of the output current. The power converter and protection circuit may also provide protection against short circuit and over-voltage of the power converter.

In some embodiments, the EMI filter and bridge rectifier 75 filters the high frequency noise to keep it within the limits of the FCC standard. The bridge rectifier and filter rectifies the AC input to DC output. In some embodiments, a filter capacitor stores the energy and support the peak current required by the power conversion stage.

Still referring to FIG. 3, the aforementioned components may be incorporated into the lamp 100 in combination with further components, such as a communication module 90, loudspeaker 95 and sensors 110 in addition to the gyroscopic motion sensor 25. Examples of additional sensors 110 that are incorporated into the lamp 100 can include a microphone 111, an ambient light sensor 113, a 3D depth sensor 114, an accelerometer 116, and a gravity sensor 117. It is noted that the aforementioned sensors 110 can be optional, in which any of the aforementioned sensors 110 can be omitted. Additionally, the lamp 100 can include at least one processor 85 and at least one memory component 80 that can be additional to the processor and the controller memory 51 of the microcontroller 50.

It is noted that the aforementioned components, e.g., driver/power converter 55, processor 85, memory 80, sensors 110, communication module 90, and loudspeaker 90 may be configured to be operatively coupled, e.g., via a communication bus 205 or other suitable interconnect) to function with the light sources, LEDs 31, the microcontroller 50, the gyroscopic sensor 25 or other corresponding componentry to control the light output provided by the LEDs 31.

The communication module 90 may be in communication with at least the microcontroller 50 of the lamp 100. The communication module 90 can provide the means by which a user of the lamp 100 can program the lamp 100. For example, through the communication module 90 commands can be programmed to the motion to light command application 52 of the controller memory 51 in the microcontroller 50 to correlate motions applied to the lamp 100 to adjustments in the light characteristics being emitted by the light source, e.g., LEDs 31, of the lamp 100. One example of commands correlating motions/gestures applied to the lamp 100 to adjustments in the characteristics of light being projected by the light source, e.g., LEDs 31, of the lamp 100 is provided in FIG. 7. It is noted that this is only one example of commands that can be programmed to the microcontroller, and it is not intended that the methods, structures and computer program products be limited to only this example.

In some embodiments, the communication module 90 can be configured for wired (e.g., Universal Serial Bus or USB, Ethernet, FireWire, etc.) and/or wireless (e.g., Wi-Fi, Bluetooth, etc.) communication, as desired. In accordance with some embodiments, communication module 90 may be configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol, and/or (6) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by the communication module 90, as desired for a given target application or end-use. In some instances, communication module 90 may be configured to facilitate inter-system communication between the lamp 100 and/or communication between lamp(s) 100 and a mobile computing device 500.

It is noted that the communication module 90 may be in communication with other elements of the lamp structure 100, such as other processors 85 and/or memory 80 that provide other functions for the lamp 100 that are separate to the lighting adjustments controlled through the microcontroller 50. For example, the address of the lamp 100, i.e., its location and designation in a network of lamps, and its function in the network of lamps 100 can be stored and controlled using the processor 85 and memory 80. The type of devices for the additional processors 85 and/or memory 80 can be similar to the hardware processors and controller memory 51 in the microcontroller 50. Therefore, the above description of the memory and processor from the microcontroller 50 can provide at least one example for the description of the additional processors and/or memory 80. For example, the memory can be a form of RAM, in which the processor 85 may be configured to perform operations associated with lamp 100 and one or more of the modules of memory 80 within the lamp 100.

In accordance with some embodiments, a given lamp 100 may include one or more optional sensors 110 that may be included in addition to the gyroscopic sensor 25. In some embodiments, a given luminaire 100 may optionally include at least one microphone 111 (or sound capture device), ambient light sensor 113, 3-dimensional (3D) depth sensor 114, accelerometer 116, gravity sensor 117 and/or any other suitable sensor to, for example, implement the techniques variously described herein. In one example, the microphone 111 may be configured to detect voice commands used to control the lamp 100.

The ambient light sensor 113 measures the ambient light and can be used in combination with the microcontroller 50 to adjust the light characteristics of the light being emitted by the light source, e.g., LEDs 31, of the lamp 100 in response to the ambient light of the atmosphere in which the lamp 100 is present. The ambient light sensor 113 may be employed to increases or decrease the intensity of the light being emitted by the light source, e.g., LEDs 31, depending upon changes in the ambient lighting brightness, which can conserve power usage by the lamp 100. In one example, an ambient light sensor 113 may include a built-in photodiode and current amplifier circuit, which can be used to adjust the LED luminosity.

Still referring to FIG. 3, the accelerometer 116 is a sensor that is configured to acceleration applied to the mobile computing device 100. For instance, a linear accelerometer may be included for measuring moving forces applied to the lamp 100. The linear measurements are measured in units of $m/s^2$. The linear motions measured by the accelerometer 116 may be used for commands other than adjusting the characteristics of the light being emitted by the light source, e.g., LEDs 31. As noted above, the rotational motions measured by the gyroscopic sensor 25 are used to adjust the light properties of the light being emitted by the light source, e.g., LEDs 31, of the lamp 100. In some embodiments, linear movements applied to the lamp 100 may be used for commands to initiate a light adjustment period, in which the gyroscopic sensor 25 makes measurements of rotational movements and applies those measurements through the microcontroller 50 for making light adjustments. For example, the lamp 100 may be lifted straight up, and the linear upward motion measured by the accelerometer 116 may provide a command to being a light adjustment period. In other embodiments, linear motions applied by the accelerometer 116 may be employed to confirm lighting adjustments made through rotational motions/gestures applied to the lamp 100 that are measured by the gyroscopic sensor 25. In other embodiments, linear motions applied by the accelerometer 116 may be employed to end a light adjustment period.

It is noted that the gyroscopic sensors 25, and accelerometer 116 are not the only sensors that can be used by the lamp 100. Gravitational sensors 117 are sensors configured to measure gravitational forces acting upon the lamp 100. Gravitational sensors 117 may be employed to measure motions/gestures applied to the lamp 100 for commands similar to those described with respect to the accelerometer 116. Additionally, 3D depth sensors 114 may also be applied for measuring motions/gestures applied to the lamp 100, and using those motions/gestures to control some functionality of the lamp 100. It should be noted that the present disclosure is not so limited only to the example optional sensors 110 shown, as additional and/or different sensors 110 may be provided, as desired for a given target application or end-use, in accordance with some other embodiments.

In accordance with some embodiments, a given lamp 100 may include one or more loudspeakers 95 or other audio output devices. Loudspeaker(s) 95 can be, for example, a speaker or any other device capable of producing sound from an audio data signal, in accordance with some embodiments. Loudspeaker(s) 95 may be programmed using any suitable techniques and they may be configured to output audio related to the lighting control techniques described herein. For example, at least one of the microcontroller 50, and/or processor 85/memory 80 may be configured to control audio output of the loudspeaker(s) 95 provide audio feedback as to whether an attempted command has been recognized or provide audio feedback relating to the specific command detected or the resulting change in light output (e.g., dimming lights by 10%, changing light color to red, etc.).

It is noted that the lamp 100 including the gyroscopic sensor 25 that has been described above with reference to FIGS. 2A-4, 6 and 7 is only one example of a lamp 100 that is suitable for the methods, structures and computer program products described herein. Embodiments have been contemplated in which some of the elements of the lamp 100, such as some electrical components from the electronics package 200 and/or structural components of the lamp 100, can be omitted, and some embodiments have been contemplated, in which additional components not described herein may be present.

Referring to FIG. 1, the lamp 100 having the gyroscopic sensor 25, such as the lamp 100 that is described with reference to FIGS. 2A-4, 6 and 7, can be installed into a lamp fixture 300 having a moveable light socket at step 2. FIGS. 5A-5D depict a lamp identified by reference number 100 installed in a lamp fixture identified by reference number 300 having a neck/arm configured to provide a moveable light socket. The term "movable" means that the neck 305 (also referred to as the arm) and/or the lamp shade portion 301 of the lamp fixture 300 can be manipulated to traverse the light socket containing the lamp 100. The neck 305 is connected to the light socket and shade of the lamp fixture 300. FIGS. 5A-5D illustrate movements applied to the moveable light socket containing the lamp 100.

In some embodiments, the moveable neck of the lamp fixture 300 is a gooseneck type lamp neck/arm, as depicted in FIGS. 5A-5D. A gooseneck lamp is a type of light fixture 300 in which a lamp 100 or lightbulb is attached to a flexible, adjustable shaft, i.e., the arm or neck 305 of the lamp fixture 300, to allow the user to position the light source without moving the fixture base or item to be illuminated. Although FIGS. 5A-5D illustrate a lamp fixture 300 including a gooseneck lamp arm/neck with a desk lamp base, gooseneck lamps may also be free standing floor lamps or may have magnetic bases for industrial applications.

Further, it is not intended that the lamp fixture 300 employed by the method only be a lamp fixture 300 including a gooseneck lamp arm/neck. It is noted that any lamp fixture 300 having a moveable neck/arm is suitable for use with the methods, structures and computer program products that are described herein. Other examples of lamp fixtures 300 suitable for use with the methods, structures and computer program products that are described herein include lamp fixtures 300 having swing arms; lamp fixtures 300 having flexible arms; lamp fixtures 300 having jointed arms; lamp fixtures 300 having balanced arms; lamp fixtures 300 with pneumatic cylinders; and combinations thereof. It is noted that any lamp fixture 300 that allows for rotational movement of the lamp socket to which the lamp 100 is engaged is suitable for use with the methods, structures and computer program products that are described herein.

In some embodiments, a lamp 100 can be engaged to the lamp socket of the lamp fixture 300 by screw engagement. The lamp socket provides for electrical connection of the lamp 100, i.e., provides electrical communication to the base 10 of the lamp 100. Although the lamp depicted in FIGS. 2A and 2B includes a base 10 for screw engagement to a lamp socket, the methods described herein are not limited to only this example. Other interfaces of engagement between the base 10 of the lamp 100 and the lamp socket of the lamp fixture 300 are equally suitable, such as recessed single contact, 2-pin contact, 2-contact with wire loops, twist contact, double contact bayonet, single contact bayonet, screw terminal, mogul end prong, side prong and combinations thereof.

At step 3 of the method depicted in FIG. 1, the method may continue with programming the controller, i.e., microcontroller 50, to include at least one command for adjusting light characteristics in response to a motion/gesture applied to the lamp 100 and measured by the gyroscopic sensor 25. FIG. 7 includes a table of motions/gestures applied to the lamp 100 and the commands correlated to the motion/gesture for adjusting the characteristics of light being projected by the light source of the lamp 100. The commands included in FIG. 7 can be programmed at step 3 into the microcontroller 50 as instructions in the light command application 52 correlating rotational motions measured by the gyroscopic sensor 25 to the characteristics of light emitted by the light source, LED 31. The commands, i.e., light ON/light OFF, light color adjustment (cycle), light intensity adjustment (cycle), and/or light color temperature adjustment, that are listed in FIG. 7 are only some examples of commands that can be programmed into the microcontroller 50 for adjusting light characteristics in response to gestures applied to the lamp 100. It is not intended that the methods, structures and computer program products described herein is not limited to the list of commands depicted in FIG. 7, as other commands are equally applicable.

Programming the commands to the microcontroller 50 may be achieved using a computer and/or mobile computing device 500 by hard wire connection to the lamp 100 or by wireless communication. The computer and mobile computing device 500 can each be a machine for computing calculations including a hardware processor. The computer may be a desktop type computer and/or laptop type computer. One example of mobile computing device 500 that is suitable for use with the light control methods, systems and computer program products that are described herein includes a phone having at least an operating system capable of running applications, which can be referred to as a smart phone. In addition to cellular access, the smart phones can also have internet access. Other examples of a mobile computing devices 500 that are suitable for use with the methods, systems and computer program products described herein include a tablet or phablet computer; a personal digital assistant (PDA); a portable media player (PMP); a cellular handset; a handheld gaming device; a gaming platform; a wearable or otherwise body-borne computing device, such as a smartwatch, smart glasses, or smart headgear, and/or a combination of any one or more thereof.

Figure 8:
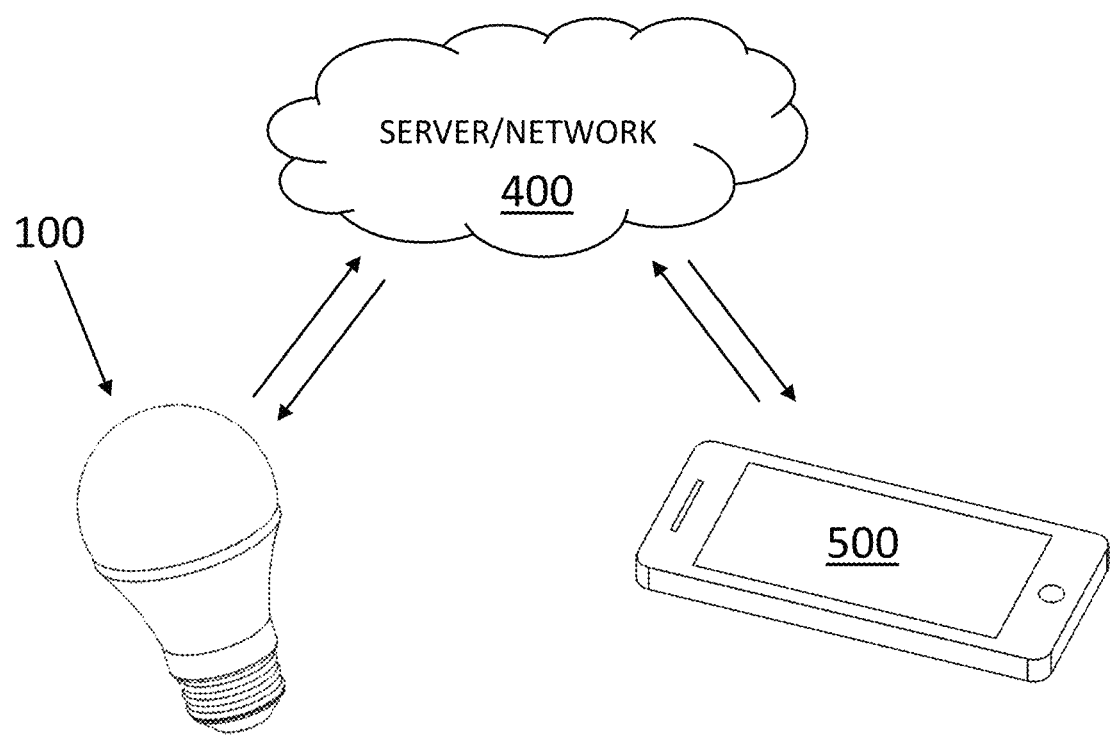
FIG. 8 is an illustration depicting one example of a lighting system that can employ the lamp structure having the gyroscopic sensor incorporated therein to measure movements of the lamp structure to control the characteristics of the light being projected by the lamp, in accordance with one embodiment of the present disclosure.

Communication between the computer/mobile computing device 500 and the lamp 100 for projecting the light is typically through a wireless connection, such as WiFi, Bluetooth, internet based connections, cellular connections and combinations thereof. In other embodiments, the communication between the computer/mobile computing device 500 and the lamps 100 projecting the light may be through a wired connection, such as a local network connection, e.g., Ethernet type connection. As described herein, the lamp 100 can include a communications module 90 providing for communication between controller type devices for programming and maintenance purposes, such as the computer/mobile computing device 500, as well as communication with other neighboring lamps 100. FIG. 8 illustrates an example lighting system, in accordance with an embodiment of the present disclosure. The lighting system may include at least one lamp 100, a controller for programming the lamp 100, e.g., computer/mobile computing device 500, and a network 400. Although only one lamp 100 is depicted, the lighting system can include multiple lamps 100. The lamp 100 and the mobile computing device 500 may be configured to be communicatively coupled using, for example, server/network 400.

It is noted that step 3 of the method depicted in FIG. 1 is optional. The lamp 100 may be preprogrammed to have a series of commands correlating motions/gestures applied to the lamp 100, i.e., rotational motions applied to the lamp 100 and measured by the gyroscopic sensor 25, to adjusting the characteristics of light being projected by the light source, e.g., LEDs 31, of the lamp 100. Additionally, it is not necessary that the microcontroller 50 be programmed after the lamp 100 is installed into the lamp fixture 300. As noted above, the microcontroller 50 has its own power source 60. Therefore, the microcontroller 50 may be programmed at any time including before the lamp 100 being installed into the light socket of the lamp fixture 300.

Following programming of the lamp 100, as well as installation of the lamp 100 into the light socket of the lamp fixture 300 having a moveable neck/arm that allows for rotation of the lamp 100, the characteristics of the light being emitted by the light source, e.g., LEDs 31, may be adjusted. Adjustment of the lighting characteristics is provided by applying rotational movements, i.e., gestures, to the lamp 100 as it is engaged to the light socket of the lamp fixture 300. The rotational movements are measured by the gyroscopic sensor 25 that is present within the lamp 100, and are translated by the microcontroller 50 to lighting changes in the light emitted by the light source, e.g., LEDs 31, of the lamp 100. The light adjustments occur simultaneously with the movements applied to the lamp 100. By "simultaneously" it is meant that the changes in the light being emitted by the light source, e.g., LEDs 31, occurs as the same time that the user is applying a motion, i.e., gesture, to the lamp 100 for the purposes of adjusting the lighting characteristics of the lamp 100. In this manner, as the user is applying the motion to the lamp 100, which is measured by the gyroscopic sensor 25 and translated by the microcontroller 50 into a command to change lighting characteristics of the light being projected by the LEDs 31, the user can view the changes in the light being emitted simultaneously with the motion initiated commands for lighting changes being applied to the lamp 100.

In some embodiments, a period of lighting adjustment may be initiated by a lighting adjustment ON command. The lighting adjustment ON command may be signaled by a motion applied to the lamp 100. For example, when the lamp 100 is installed in a lamp fixture 300 that is a desk lamp, the lighting adjustment ON command can be signaled by lifting the desk lamp from the surface that the desk lamp is present on. The lifting of the desk lamp can be measured by the gyroscopic sensor 25, wherein the lifting motion measured by the gyroscopic sensor 25 can be translated to a light adjustment ON command by the microcontroller 50. Any rotational movement applied to the lamp 100 can be used by the lamp 100 to signal the lighting adjustment ON command, so long as the light command application 52 in the controller memory 51 of the microcontroller 50 has been programmed to recognize that the rotational movement is correlated to the lighting adjustment ON command. It is not necessary, that the lighting adjustment ON command be signaled by a rotational motion measured by the gyroscopic sensor. For example, the lifting to the lamp fixture 300 including the lamp 100 can be measured in a linear fashion using the accelerometer 116, in which the linear movement of the lamp 100 being lifted and measured is correlated to the light adjustment ON command. Additionally, the 3D depth sensor 114 and/or the gravity sensor 117 may contribute to measuring motions applied to the lamp 100, and using those motions as a command to signal the start of a light adjustment period. It is not necessary, that the light adjustment ON command by initiated by a motion applied to the lamp 100. For example, voice commands, such as the term "LIGHT ADJUSTMENT" can be received by the microphone 111 of the lamp 100, in which the voice command can initiate the light adjustment period. In yet another example, a button or switch, e.g., ON/OFF rocker switch, may be present on the lamp 100 that when selected by the user can initiate the light adjustment period. In an even further embodiment, gestures, e.g., hand signals by the user, can be measured by the lamp 100, e.g., through the use of a camera, which can then be translated by a controller of the lamp 100, e.g., microcontroller 50 and/or processor 85, to initiate the light adjustment period.

In some embodiments, at the start of the light adjustment period, the initial orientation and location of the lamp 100 is recorded, which provides a reference point from which rotational movements are measured by the gyroscopic sensor 25 for the movements that are applied to the lamp 100 as commands by the user to adjust the lighting characteristics of the light being emitted from the light source, e.g., LEDs 31, of the lamp 100.

The method may continue with a user that wishes to adjust the lighting characteristics of light being emitted from a lamp 100 applying at least one movement to the lamp 100 that is mounted into the light socket of the lamp fixture 300 at step 4 of the flow chart depicted in FIG. 1. The rotational movements applied to the lamp 100 are measured by the gyroscopic sensor 25 of the lamp at step 5 of the flow chart depicted in FIG. 1. Although these steps are depicted in the flow chart illustrated in FIG. 1 as being separate, the movement applied by the user to the lamp 100, and its measurement by the gyroscopic sensor 25 occur substantially simultaneously in practice.

Figure 5A:
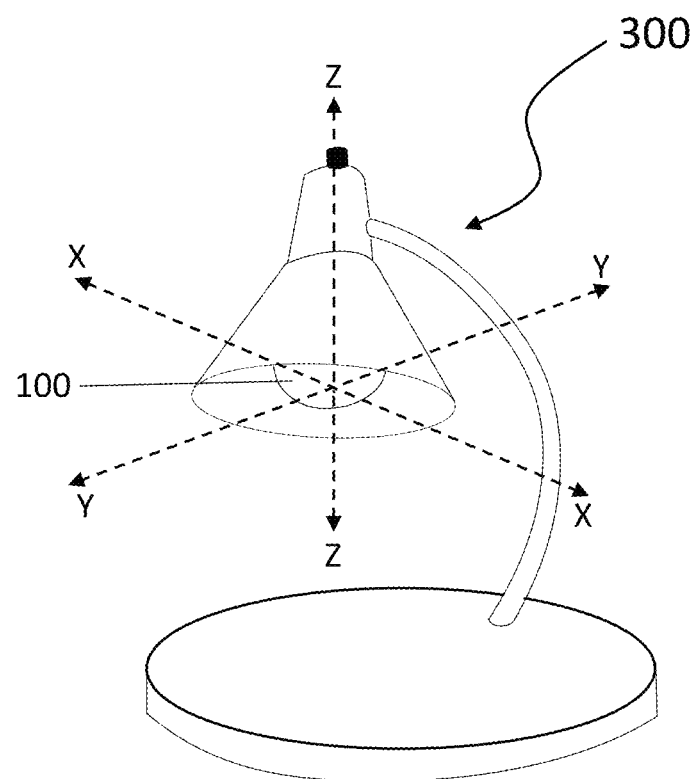
FIG. 5A is a perspective view of a lamp fixture having referential axis in which movement of the lamp that is mounted in the lamp fixture about the referential axis can be measured by a gyroscopic sensor within the lamp, wherein the motion of the lamp measured by the gyroscopic sensor can be employed as a mechanism for controlling a plurality of selectable light function settings, in accordance with one embodiment of the present disclosure.

When describing motions, i.e., gestures, which are applied to the lamp 100, and motions measured by the gyroscopic sensor 25, establishment of an inertial frame of reference can be helpful. In this example embodiment, the X-X, Y-Y, and Z-Z axis are shown in FIG. 5A, which define a three-dimensional Cartesian coordinate system applied to the lamp 100 that is installed within the lamp fixture 300, may be used to provide such an inertial frame of reference. Comparison of the three dimensional Cartesian coordinate system applied to the lamp 100 installed in the lamp fixture 300 depicted in FIG. 5A, and the Cartesian coordinate system applied to the gyroscopic sensor 25 that is depicted in FIG. 4 illustrates how the representative axis in the gyroscopic sensor 25 can be matched to the representative axis with respect to the lamp 100 installed in the lamp fixture 300 that is depicted in FIG. 5A.

Figure 5B:
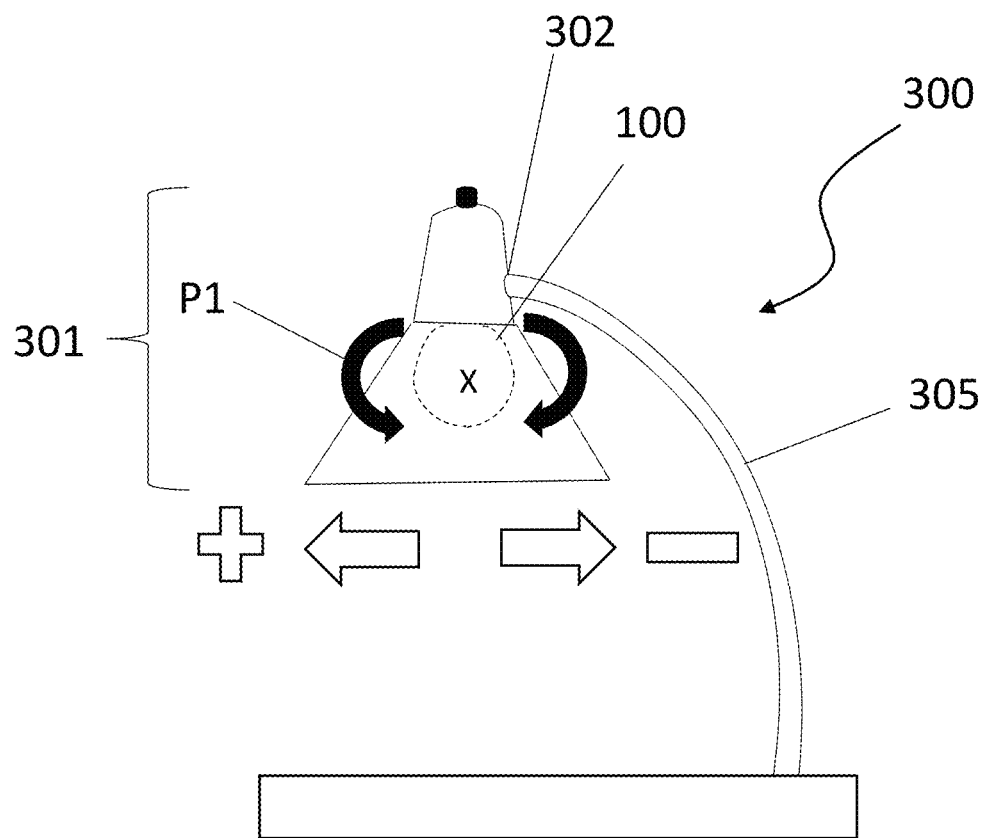
FIG. 5B is a side cross-sectional view of the lamp fixture depicted in FIG. 5A depicting pitch motion of the lamp about the X-X axis that is depicted in FIG. 5A.

Referring to FIG. 5A, as can be seen in this example case, the origin of the coordinate system is the center of lamp 100 including the gyroscopic sensor 25. Referring to FIG. 5B, moving the lamp 100 that is engaged to the light socket of the lamp fixture 300 forward (positive (+) direction) or backward (negative (−) direction), e.g., by tilting the lamp shade portion 301 of the lamp fixture 300 forward (+) or backward (−) to provide a pivoting motion at the connection 302 of the lamp shade portion 301 with the neck 305 or arm of the lamp fixture 300, rotates the lamp 100 about the X-X axis. This form of rotation can be referred to as a pitch P1, which is also illustrated by the pitch motion P1 applied to the gyroscopic sensor 25 depicted in FIG. 4.

Figure 5C:
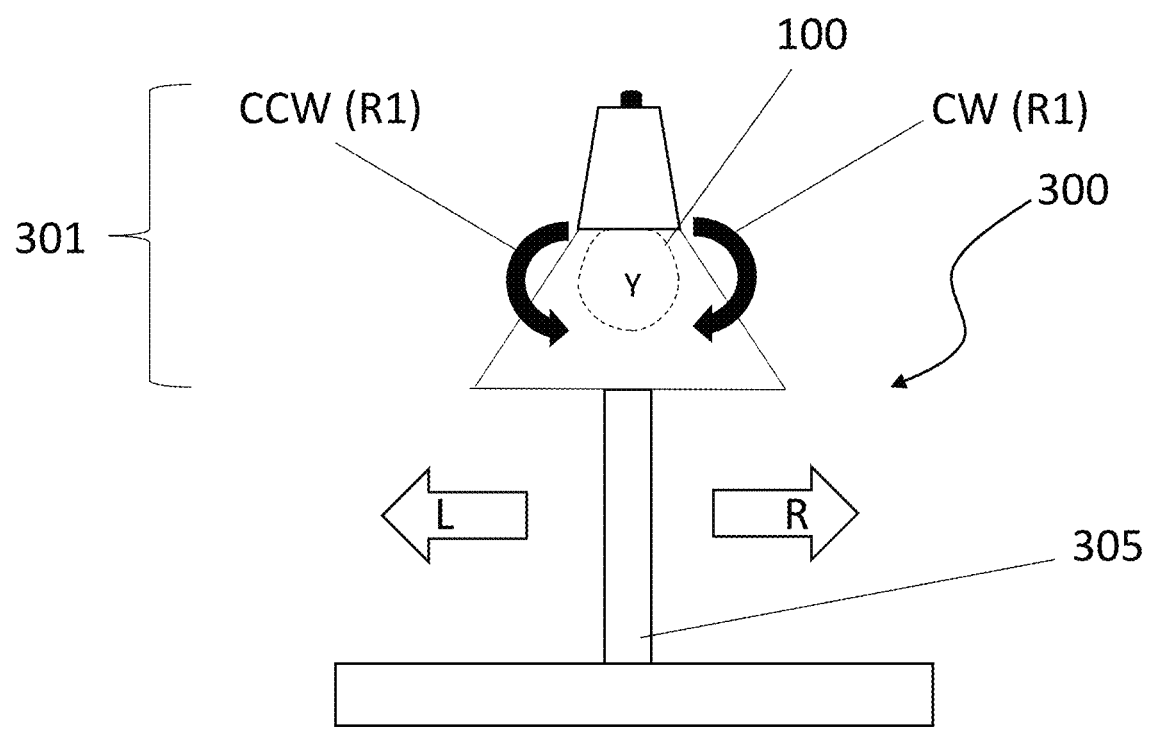
FIG. 5C is a side cross-sectional view of the lamp fixture depicted in FIG. 5A depicting rotational motion of the lamp about the Y-Y axis that is depicted in FIG. 5A.

Referring to FIG. 5C, moving the lamp 100 that is engaged to the light socket of the lamp fixture 300 left (L) or right (R) at the lamp shade portion 301, e.g., by tilting the lamp shade portion 31 of the lamp fixture 300 left (L) or right (R) to provide a pivoting motion at the connection 302 (not depicted in FIG. 5C due to the connection being at the back of the of the lamp shade portion 301) with the neck 305 or arm of lamp fixture, rotates the lamp 100 about the Y-Y axis. This form of rotation can be referred to as roll R1, which is also illustrated by the roll motion R1 applied to the gyroscopic sensor depicted in FIG. 4. Roll R1 to the right R is a counter clockwise (CCW) rotation, while roll R1 to the left L is a clockwise (CW) rotation.

Figure 5D:
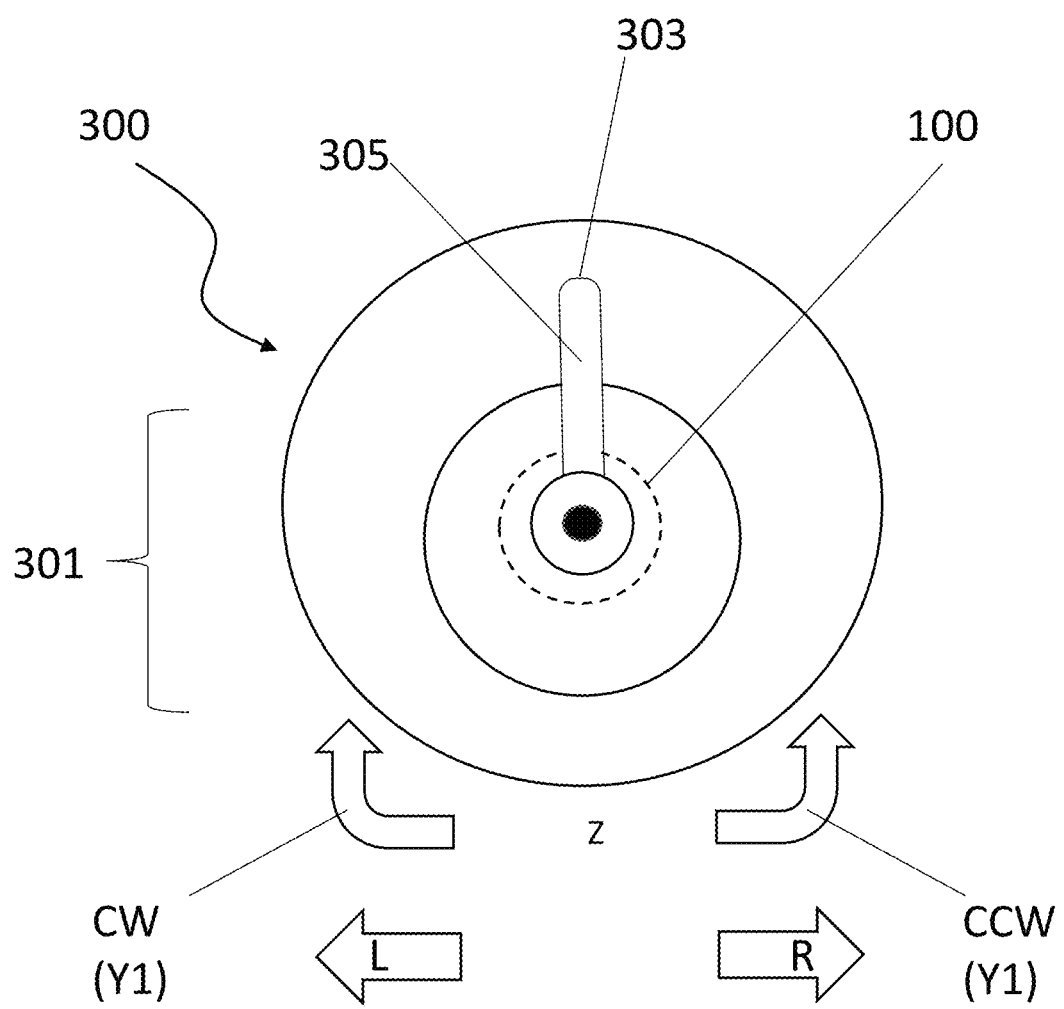
FIG. 5D is a side cross-sectional view of the lamp fixture depicted in FIG. 5A depicting yaw motion of the lamp about the Z-Z axis that is depicted in FIG. 5A.

Referring to FIG. 5D, moving the lamp 100 that is engaged to the light socket of the lamp fixture 300 to swing the neck 305 or arm about its pivot point 303 at the base of the lamp fixture 300 rotates the lamp 100 about the Z-Z axis. This form of rotation can be referred to as yaw Y1, which is also illustrated by the yaw motion Y1 applied to the gyroscopic sensor 25 depicted in FIG. 4. Yaw Y1 to the right R is a counter clockwise (CCW) rotation, while roll R1 to the left L is a clockwise (CW) rotation.

Any of the aforementioned movements may be applied to the lamp 100 by a user, and may be correlated to a command to be implemented by the user for adjusting the light emitted by the light source, e.g., LED 31, of the lamp 100. Other motions not specifically described above may also be used for motions applied to the lamp 100 in adjusting lighting characteristics of the light source, e.g., LED 31, so long as the motions applied can be measured using the gyroscopic sensor 25, e.g., are rotational movements.

Step 5 of the method depicted in FIG. 1 includes measuring the at least one type of movement applied to the lamp 100 with the gyroscopic sensor 25. The gyroscopic sensor 25 has been described above with reference to FIGS. 2A, 2B, 3 and 4. The gyroscopic sensor 25 measures rotational motion. The units for the rotational motion may be in radians per second (rad/s). Additionally, the motions measured by the gyroscopic sensor 25 may be expressed in the form of a vector. In some embodiments, the electrical output of the gyroscopic sensor 25 can be an output voltage.

In some embodiments, a first rotational movement about the x-axis, i.e., pitch P1, is measured by the gyroscopic sensor 25 to provide a first electrical signal corresponding to a first light characteristic, a second rotational movement about the y-axis, i.e., roll R1, is movement measured by the gyroscopic sensor to provide a second electrical signal corresponding to a second light characteristic, and a third rotational movement about the z-axis, i.e., yaw Y1, is a movement measured by said gyroscopic sensor to provide a third electrical signal corresponding to a third light characteristic. The correlation between the rotational motions applied to the lamp 100 that are measured by the gyroscopic sensor 25 and the signaling of commands for lighting characteristic adjustments correlated to the rotational motions measured by the gyroscopic motion sensor may be provided at step 6 of the method depicted in FIG. 1.

In some embodiments, step 6 of the method depicted in FIG. 1 includes converting with the microcontroller 50 the at least one type of movement applied to the lamp 100 measured by the gyroscopic sensor 25 to a characteristic of light to be projected by the light source, e.g., LED 31, for the lamp 100 when the movement measured by the gyroscopic sensor 25 matches a movement (also referred to as gesture applied to the lamp) that has been correlated to a command for a lighting adjustment. The microcontroller 50 has been described above with reference to FIGS. 2A, 2B, and 3. The microcontroller 50 includes controller memory 51 including the motion to light command application 52 that can be encoded with commands that when executed by a processor carries out at least a portion of the functionality of lamp 100 to adjust the lighting characteristics of light source, e.g., LEDs 31. One example of commands that can be employed by the microcontroller 50 to correlate motions applied to the lamp 100, which can be measured by the gyroscopic sensor 25, to lighting characteristics is provided in the table included in FIG. 7.

In some embodiments, once the microcontroller 50 receives a measurement of a movement from the gyroscopic sensor 25 that matches a rotational movement that has been assigned to a lighting characteristic adjustment, a signal for the lighting characteristic adjustment is sent from the microcontroller 50 to the light source, e.g., LEDs 31, to cause an adjustment in the lighting characteristics of the light being emitted from the LEDs 31. The lighting characteristic adjustment may include a command from the microcontroller 50 to turn the lamp 100 ON; a command to turn the lamp 100 OFF; a command to change the color of the light being emitted by the lamp 100; a command to change the light color temperature of the light being emitted by the lamp 100; and/or to change the light intensity/dimming of the light being emitted by the lamp 100. The command from the microcontroller 50 may be sent to the LED string switching circuit 70, which in turn goes to the LEDs 31 that provide the light source for the lamp 100.

Turning to step 7 of the method depicted in FIG. 1, the method may continue with projecting light from the light source, e.g., LED 31, having the characteristic of light matching the movement that has been assigned by the motion to light command application 52 of the controller memory 51 from the microcontroller 50. It is noted that steps 4, 5, 6 and 7 although occurring in the sequence depicted in FIG. 1, occur substantially simultaneously in practice when observed by the user of the lamp 100 applying movements to the lamp 100 to adjust the lighting characteristics of the light being emitted by the lamp 100.

Referring to FIGS. 5B and 7, in one embodiment, a user applying a movement to the lamp shade portion 301 of the lamp fixture 300 to cause a pitch P1 rotation to the lamp 100 about the X-X axis, can turn the light source of the lamp 100 to ON (illuminate/energize an LED 31 light source) when the pitch P1 rotation is positive (+), or in the forward direction. The positive (+) pitch P1 rotation that is applied to the lamp 100 is measured by the gyroscopic sensor 25. The gyroscopic sensor 25 sends a signal to the microcontroller 50. The microcontroller 50 correlates the positive (+) pitch rotation to an ON command for the light source of the lamp 100. The microcontroller 50 sends a signal to the LEDs 31 of the light source to turn ON.

Referring to FIGS. 5B and 7, in one embodiment, a user applying a movement to the lamp shade portion 301 of the lamp fixture 300 to cause a pitch P1 rotation to the lamp 100 about the X-X axis, can turn the light source of the lamp 100 to OFF (de-energize/no illumination of the LED 31 light source) when the pitch P1 rotation is negative (−), or in the back direction. The negative (−) pitch P1 rotation that is applied to the lamp 100 is measured by the gyroscopic sensor 25. The gyroscopic sensor 25 sends a signal to the microcontroller 50. The microcontroller 50 correlates the negative (−) pitch rotation to an OFF command for the light source of the lamp 100. The microcontroller 50 sends a signal to the LEDs 31 of the light source to turn OFF.

Referring to FIGS. 5C and 7, in one embodiment, a user applying a movement to the lamp shade portion 301 of the lamp fixture 300 to cause a roll R1 rotation to the lamp 100 about the Y-Y axis from the reference position to a roll left (L) position, i.e., clock wise (CW), can adjust the color of the light being emitted by the light source, e.g., LED 31, of the lamp 10. The reference point is the initial orientation and location of the lamp 100 that is recorded at the start of the light adjustment period, and provides the reference point from which rotational movements are measured by the gyroscopic sensor 25. The left (L) roll R1 rotation that is applied to the lamp 100 is measured by the gyroscopic sensor 25. The gyroscopic sensor 25 sends a signal to the microcontroller 50. The microcontroller 50 correlates the left (L) roll/clockwise (CW) rotation to a start color cycle command for the light source of the lamp 100. The microcontroller 50 sends a signal to the LEDs 31 of the light source to start cycling colors for projection by the LEDs 31 for selection by the user.

In some embodiments, the color of the light being emitted by the light source, e.g., LED 31, of the lamp 100 is adjusted by cycling from a white color that is the default color for the light source to a color that is different from the default color. In some embodiments, the color of the light being emitted by the light source, e.g., LED 31, may be cycled through the colors of the red (R), orange (O), green (G), blue (B), indigo (I), and violet (V).

For example, the color may cycle from the default color, e.g., white, to a sequence having an order as follows: red (R), orange (O), green (G), blue (B), indigo (I), and violet (V). In some embodiments, cycling of the colors further includes the numerous shades of the aforementioned families of colors. For example, as the colors cycle from red (R) to orange (O) multiple shades of red (R) and orange (O) mixtures may be projected by the light source. For example, as the colors cycle from the base color red to the base color orange, starting with the base red color shades of red having an increasing amount of orange are emitted until the base orange color is reached. Similarly, mixtures or orange (O) and green (G); mixtures of green (G) and blue (B), mixtures of blue (B) and indigo (I), and mixtures of indigo (I) and violet (V) can also be emitted by the light source, e.g., LED 31, as the colors cycle in response to the roll left (L) position, i.e., clockwise (CW), motion applied to the lamp 100 and measured by the gyroscopic sensor 25. In some embodiments, the number of shades and colors that the lamp 100 may cycle through for selection by the user for adjustment of the color of the light being emitted by the light source, e.g., LED 31, may be equal to 1, 5, 10, 15, 20, 30, 40, 50 and 100, and any range for the number of color shades in which one of the aforementioned examples provides a lower limit to the range and one of the aforementioned examples provides an upper limit to the range, as well as any value within those ranges.

In some embodiments, the display period for each color being cycled by the lamp 100 can be increased or decreased by the degree of rotation applied in the movement of the lamp 100. For example, increasing the movement to the roll left (L) position, i.e., increasing clockwise (CW) rotation, decreases the display period for each color being cycled to increase the rate at which the lamp 100 cycles through the colors for selection by the user.

Still referring to FIGS. 5C and 7, in one embodiment, when the cycling of colors of light being emitted by the light source, e.g., LED 31, provides a color that the user wishes to select, the user may apply a movement to the lamp 100 that functions as a command to stop the light color cycle to set a selected light color for continued emission by the light source, e.g., LEDs 31, of the lamp 100. For example, a user applying a movement to the lamp shade portion 301 of the lamp fixture 300 to cause a roll R1 rotation to the lamp 100 about the Y-Y axis from the roll left position back to the neutral position (also referred to as the reference point that is set at the start of the light adjustment period) in a right (R) roll, i.e., counter clockwise (CCW) rotation, can stop the light color cycle to set a selected light color for continued emission by the light source, LEDs 31, of the light source for the lamp 100. The right (R) roll R1 rotation that is applied to the lamp 100 is measured by the gyroscopic sensor 25. The gyroscopic sensor 25 sends a signal to the microcontroller 50. The microcontroller 50 correlates the right (R) roll/counter clockwise (CCW) rotation to a stop color cycle/set selected light color command for the light source of the lamp 100. The microcontroller 50 sends a signal to the LEDs 31 of the light source to stop cycling colors and to project light having the selected color.

It is noted that the command for stopping the color cycle and setting the color to be emitted by the light source does not have to be a command applied through movements measured by the gyroscopic sensor 25. For example, selection of a color from the color cycle can be accomplished using voice command, such as vocalization of the term "SET COLOR" as received by the microphone 111 of the lamp 100.

Referring to FIGS. 5C and 7, in one embodiment, a user applying a movement to the lamp shade portion 301 of the lamp fixture 300 to cause a roll R1 rotation to the lamp 100 about the Y-Y axis from the reference position to a roll right (R) position, i.e., counter clock wise (CCW), can adjust the color temperature of the light being emitted by the light source, e.g., LED 31, of the lamp 10. The reference point is the initial orientation and location of the lamp 100 that is recorded at the start of the light adjustment period, and provides the reference point from which rotational movements are measured by the gyroscopic sensor 25. The right (R) roll R1 rotation that is applied to the lamp 100 is measured by the gyroscopic sensor 25. The gyroscopic sensor 25 sends a signal to the microcontroller 50. The microcontroller 50 correlates the right (R) roll/counter clockwise (CCW) rotation to a start color temperature cycle command for the light source of the lamp 100. The microcontroller 50 sends a signal to the LEDs 31 of the light source to start cycling color temperatures for projection by the LEDs 31 for selection by the user. In some embodiments, the color temperature may cycle from "cool temperatures" to "warm temperatures". Color temperatures over 5000 K are called "cool colors" (bluish white), while lower color temperatures (2700-3000 K) are called "warm colors" (yellowish white through red).

In some embodiments, the display period for each color temperature being cycled by the lamp 100 can be increased or decreased by the degree of rotation applied in the movement of the lamp 100. For example, increasing the movement to the roll right (R) position, i.e., increasing clockwise (CW) rotation, decreases the display period for each color temperature being cycled to increase the rate at which the lamp 100 cycles through the color temperatures for selection by the user.

Still referring to FIGS. 5C and 7, in one embodiment, when the cycling of color temperatures of light being emitted by the light source, e.g., LED 31, provides a color temperature that the user wishes to select, the user may apply a movement to the lamp 100 that functions as a command to stop the light color temperature cycle to set a selected light color temperature for continued emission by the light source, e.g., LEDs 31, of the lamp 100. For example, a user applying a movement to the lamp shade portion 301 of the lamp fixture 300 to cause a roll R1 rotation to the lamp 100 about the Y-Y axis from the roll right position back to the neutral position (also referred to as the reference point that is set at the start of the light adjustment period) in a left (L) roll, i.e., clockwise (CW) rotation, can stop the light color temperature cycle to set a selected light color temperature for continued emission by the light source, LEDs 31, of the light source for the lamp 100. The left (L) roll R1 rotation that is applied to the lamp 100 is measured by the gyroscopic sensor 25. The gyroscopic sensor 25 sends a signal to the microcontroller 50. The microcontroller 50 correlates the left (L) roll/clockwise (CW) rotation to a stop color temperature cycle/set selected light color temperature command for the light source of the lamp 100. The microcontroller 50 sends a signal to the LEDs 31 of the light source to stop cycling light color temperatures and to project light having the selected light color temperature.

It is noted that the command for stopping the light color temperature cycle and setting the light color temperature to be emitted by the light source does not have to be a command applied through movements measured by the gyroscopic sensor. For example, selection of a light color temperature from the light color temperature cycle can be accomplished using voice command, such as vocalization of the term "SET COLOR TEMPERATURE" as received by the microphone 111 of the lamp 100.

Referring to FIGS. 5D and 7, in one embodiment, a user applying a movement to the lamp 100 to swing the neck 305 or arm about its pivot point 303 at the base of the lamp fixture 300, hence rotating the lamp 100 about the Z-Z axis in a yaw Y1 motion, can provide a command for increasing light intensity of the light being projected by the light source, e.g., LED 31, of the lamp 100, or can provide a command for decreasing light intensity (also referred to as increasing dimming of the light) of the light being projected by the light source, e.g., LED 31, of the lamp 100. The intensity for the light source, e.g., LEDs 31, of the lamp 100 may range from 100 lux to 1,000 lux.

For example, movement of the lamp 100 by yaw motion to the left (L), i.e., in a clockwise (CW) rotation about the pivot point 303 at the base of the lamp fixture 300, from the reference point for the lamp 100 can cycle the light intensity in increments of increasing values for the light being emitted by the light source, e.g., LED 31, of the lamp 10. The reference point for the lamp 100 is the initial orientation and location of the lamp 100 that is recorded at the start of the light adjustment period, and provides the reference point from which rotational movements are measured by the gyroscopic sensor 25. The yaw motion to the left (L), i.e., clockwise (CW) rotation, that is applied to the lamp 100 is measured by the gyroscopic sensor 25. The gyroscopic sensor 25 sends a signal to the microcontroller 50. The microcontroller 50 correlates the left (L) yaw motion/clockwise (CW) rotation to a start increasing light intensity cycle command for the light source of the lamp 100. The microcontroller 50 sends a signal to the LEDs 31 of the light source to start cycling light intensity for projection by the LEDs 31 in increasing increments for selection by the user.

Still referring to FIGS. 5D and 7, in one embodiment, when the cycling of increasing increments of light intensity being emitted by the light source, e.g., LED 31, provides a light intensity that the user wishes to select, the user may apply a movement to the lamp 100 that functions as a command to stop the light intensity cycle to set a selected light intensity for continued emission by the light source, e.g., LEDs 31, of the lamp 100. For example, a user applying a movement to the lamp 100 to swing the neck 305 or arm about its pivot point 303 at the base of the lamp fixture 300 in a counter clock wise (CCW) rotation, hence rotating the lamp 100 about the Z-Z axis in a yaw Y1 motion to a neutral position from a yaw left position can stop the increasing light intensity cycle to set a selected light intensity for continued emission by the light source, LEDs 31, of the light source for the lamp 100. The right (R) yaw motion, i.e., counter clockwise (CCW) rotation, that is applied to the lamp 100 is measured by the gyroscopic sensor 25. The gyroscopic sensor 25 sends a signal to the microcontroller 50. The microcontroller 50 correlates the right (R) yaw motion, i.e., counter clockwise (CCW) rotation, to a stop the increasing intensity cycle/set selected intensity command for the light source of the lamp 100. The microcontroller 50 sends a signal to the LEDs 31 of the light source to stop cycling increasing intensity and to project light having the selected light intensity.

In another example, movement of the lamp 100 by yaw motion to the right (R), i.e., in a counter clockwise (CCW) rotation about the pivot point 303 at the base of the lamp fixture 300, from the reference point for the lamp 100 can cycle the light intensity in increments of decreasing values to providing dimming for the light being emitted by the light source, e.g., LED 31, of the lamp 10. The reference point for the lamp 100 is the initial orientation and location of the lamp 100 that is recorded at the start of the light adjustment period, and provides the reference point from which rotational movements are measured by the gyroscopic sensor 25. The yaw motion to the right (R), i.e., counter clockwise (CCW) rotation, that is applied to the lamp 100 is measured by the gyroscopic sensor 25. The gyroscopic sensor 25 sends a signal to the microcontroller 50. The microcontroller 50 correlates the right (R) yaw motion/counter clockwise (CCW) rotation to a start decreasing light intensity cycle command for the light source of the lamp 100. The microcontroller 50 sends a signal to the LEDs 31 of the light source to start cycling light intensity for projection by the LEDs 31 in decreasing increments for selection by the user.

Still referring to FIGS. 5D and 7, in one embodiment, when the cycling of decreasing increments of light intensity being emitted by the light source, e.g., LED 31, provides a light intensity, i.e., dimmed light intensity, that the user wishes to select, the user may apply a movement to the lamp 100 that functions as a command to stop the light intensity cycle to set a selected light intensity for continued emission by the light source, e.g., LEDs 31, of the lamp 100. For example, a user applying a movement to the lamp 100 to swing the neck 305 or arm about its pivot point 303 at the base of the lamp fixture 300 in a clockwise (CW) rotation, hence rotating the lamp 100 about the Z-Z axis in a yaw Y1 motion to a neutral position from a yaw right position can stop the decreasing light intensity cycle to set a selected light intensity, i.e., dimmed light intensity, for continued emission by the light source, LEDs 31, of the light source for the lamp 100. The left (L) yaw motion, i.e., clockwise (CW) rotation, that is applied to the lamp 100 is measured by the gyroscopic sensor 25. The gyroscopic sensor 25 sends a signal to the microcontroller 50. The microcontroller 50 correlates the left (L) yaw motion, i.e., clockwise (CW) rotation, to a stop the decreasing intensity cycle/set selected dimmed intensity command for the light source of the lamp 100. The microcontroller 50 sends a signal to the LEDs 31 of the light source to stop cycling decreasing intensity and to project light having the selected dimmed light intensity.

It is noted that the command for stopping the light intensity cycle, i.e., increasing or decreasing light intensity cycle, and setting the light intensity to be emitted by the light source does not have to be a command applied through movements measured by the gyroscopic sensor 25. For example, selection of a light intensity/dimming from the light intensity cycles can be accomplished using voice command, such as vocalization of the term "SET INTENSITY" as received by the microphone 111 of the lamp 100.

It is noted that the light adjustment commands that are described with reference to FIGS. 5A-5D and FIG. 7 are provided for illustrative purposes and are not intended to limit the present disclosure to only the above described examples.

In some embodiments, when the light projected by the lamp 100 is set, either by issuing commands through motions applied to the lamp 100 that are measured by a gyroscopic sensor 25 and/or voice command, the lamp 100 may emit an affirmation signal. Examples of an affirmation signal emitted by the lamp 100 may be an audible tone or ring, a light flash or a vibration of the mobile computing device 100. The audible signal can be emitted by a speaker, i.e., loudspeaker 95, that is integrated into the lamp 100, as depicted in FIG. 3.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Spatially relative terms, such as "forward", "back", "left", "right", "clockwise", "counter clockwise", "beneath," "below," "lower," "above," "upper," and the like, can be used herein for ease of description to describe one element's or feature's relationship to another element(s) or feature(s) as illustrated in the FIGs. It will be understood that the spatially relative terms are intended to encompass different orientations of the device in use or operation in addition to the orientation depicted in the FIGs.

Having described preferred embodiments of a method, system and computer program product for controlling lighting, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A lighting method:
providing a lamp having a light source, a controller and at least one gyroscopic sensor;
measuring at least one type of movement of the lamp with said at least one gyroscopic sensor, wherein said gyroscopic sensor measures movement of said light source about an x-axis, z-axis and y-axis of a three-dimensional Cartesian coordinate system defined as the lamp is mounted to a rotatable head of a lamp fixture, wherein a first rotational movement about the x-axis is a movement measured by said gyroscopic sensor to provide a first electrical signal corresponding to a first light characteristic, a second rotational movement about the y-axis is movement measured by the gyroscopic sensor to provide a second electrical signal corresponding to a second light characteristic, and a third rotational movement about the z-axis is a movement measured by said gyroscopic sensor to provide a third electrical signal corresponding to a third light characteristic;
converting with the controller the at least one type of movement of the lamp measured by said at least one gyroscopic sensor to a characteristic of light; and projecting light from the light source having the characteristic of light converted by the controller correlated to the movement of the lamp measured by the gyroscopic sensor.

2. The method of claim 1, wherein the light source includes at least one luminescence type selected from the group consisting of light emitting diodes (LEDs), incandescent type bulbs, halogen type bulbs, fluorescent type bulbs, compact fluorescent type bulbs and combinations thereof.

3. The method of claim 1, wherein said gyroscopic sensor is selected from the group consisting of a single axis gyroscopic sensor, a dual axis gyroscopic sensor, a three axis gyroscopic sensor, a six axis gyroscopic sensor, a nine axis gyroscopic sensor and a combination thereof.

4. The method of claim 1, wherein the controller includes a processor coupled to a memory, the processor configured to convert an electrical signal received from the gyroscopic sensor to said lighting characteristic for the projecting light from the light source.

5. The method of claim 4, wherein the memory of the controller includes a plurality of instructions for said light characteristic for said projected light corresponding to a range of output voltage for the electrical signal received from the gyroscopic sensor.

6. The method of claim 5, wherein said plurality of instructions configured to be programmed and reprogrammed by a user of the lamp.

7. The method of claim 1, wherein the characteristic of light comprises light color, light color temperature, light intensity or a combination thereof.

8. A lamp comprising:
a housing including a light projecting end and a base having an electrical connector for connection with a lamp fixture;
a light source positioned at the light projecting end of the housing;
a gyroscopic sensor connected to the housing of the lamp for measuring motion of the lamp, wherein said gyroscopic sensor measures movement of said lamp about an x-axis, z-axis and y-axis of a three-dimensional Cartesian coordinate system defined as the lamp is mounted to a rotatable head of a lamp fixture; and
a controller for setting characteristics of light being projected by the light source in response to motions of the lamp being measured by the gyroscopic sensor, wherein a first rotational movement about the x-axis is a movement measured by said gyroscopic sensor to provide a first electrical signal corresponding to a first light characteristic of said light being projected by the light source, wherein a second rotational movement about the y-axis is a movement measured by the gyroscopic sensor to provide a second electrical signal corresponding to a second light characteristic of light being projected by the light source, and a third rotational movement about the z-axis is a movement measured by said gyroscopic sensor to provide a third electrical signal corresponding to a third light characteristic of light being projected by the light source.

9. The lamp of claim 8, further comprising a driver assembly for supplying power from the electrical connector for connection with the lamp fixture at the base of the housing to the light source at the light projecting end of the housing.

10. The lamp of claim 9, the driver assembly including a printed circuit board having at least one processor having a memory connected thereto, the at least one processor configured to provide the controller for setting characteristics of light being projected by the light source.

11. The lamp of claim 10, wherein the gyroscopic sensor is a component mounted to the printed circuit board.

12. The lamp of claim 10, wherein said gyroscopic sensor is selected from the group consisting of a single axis gyroscopic sensor, a dual axis gyroscopic sensor, a three axis gyroscopic sensor, a six axis gyroscopic sensor, a nine axis gyroscopic sensor and a combination thereof.

13. The lamp of claim 8, wherein the light source includes at least one luminescence type selected from the group consisting of light emitting diodes (LEDs), incandescent type bulbs, halogen type bulbs, fluorescent type bulbs, compact fluorescent type bulbs and combinations thereof.

14. The lamp of claim 8, further comprising an independent power supply in electrical communication for the gyroscopic sensor and the controller that is separate from a power supply provided by the electrical connector for connection with the lamp fixture.

15. The lamp of claim 8, wherein the characteristics of light comprises light color, light color temperature, light intensity or a combination thereof.

16. A non-transitory computer readable storage medium including contents that are configured to perform a method for controlling lighting, the method comprising:
measuring at least one type of movement of a light source of a lamp with said at least one gyroscopic sensor, wherein said gyroscopic sensor measures movement of said light source about an x-axis, z-axis and y-axis of a three-dimensional Cartesian coordinate system defined as the lamp is mounted to a rotatable head of a lamp fixture, wherein a first rotational movement about the x-axis is a movement measured by said gyroscopic sensor to provide a first electrical signal corresponding to a first light characteristic, a second rotational movement about the y-axis is movement measured by the gyroscopic sensor to provide a second electrical signal corresponding to a second light characteristic, and a third rotational movement about the z-axis is a movement measured by said gyroscopic sensor to provide a third electrical signal corresponding to a third light characteristic;
converting the at least one type of movement of the lamp measured by said gyroscopic sensor to a characteristic of light from a plurality of light settings corresponding to lamp movements; and
sending a signal to a light source of the lamp including the gyroscopic sensor to project light having the characteristic of light correlated to the movement of the lamp measured by the gyroscopic sensor.

* * * * *